(12) United States Patent
Parker

(10) Patent No.: US 12,178,283 B2
(45) Date of Patent: *Dec. 31, 2024

(54) METHOD OF MANUFACTURING A FLUID-FILLED CHAMBER WITH A REINFORCING ELEMENT

(71) Applicant: NIKE, Inc., Beaverton, OR (US)

(72) Inventor: Christopher O. Parker, Tualatin, OR (US)

(73) Assignee: NIKE, Inc., Beaverton, OR (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/704,277

(22) Filed: Mar. 25, 2022

(65) Prior Publication Data

US 2022/0211144 A1 Jul. 7, 2022

Related U.S. Application Data

(60) Continuation of application No. 16/538,342, filed on Aug. 12, 2019, now Pat. No. 11,291,269, which is a continuation of application No. 15/296,192, filed on Oct. 18, 2016, now Pat. No. 10,383,393, which is a continuation of application No. 14/039,713, filed on Sep. 27, 2013, now Pat. No. 9,491,982, which is a division of application No. 12/014,974, filed on Jan. 16, 2008, now Pat. No. 8,572,867.

(51) Int. Cl.
| | |
|---|---|
| *A43B 13/20* | (2006.01) |
| *A43B 13/04* | (2006.01) |
| *A43B 13/12* | (2006.01) |
| *A43B 13/14* | (2006.01) |
| *A43B 13/18* | (2006.01) |
| *B29D 35/12* | (2010.01) |

(52) U.S. Cl.
CPC .......... *A43B 13/186* (2013.01); *A43B 13/04* (2013.01); *A43B 13/12* (2013.01); *A43B 13/14* (2013.01); *A43B 13/141* (2013.01); *A43B 13/188* (2013.01); *A43B 13/189* (2013.01); *A43B 13/20* (2013.01); *B29D 35/122* (2013.01)

(58) Field of Classification Search
None
See application file for complete search history.

(56) References Cited

U.S. PATENT DOCUMENTS 5,224,277 A * 7/1993 Sang Do ................ A43B 7/082
36/3 R
5,353,526 A * 10/1994 Foley ................... A43B 1/0009
36/35 R (Continued)

*Primary Examiner* — Jila M Mohandesi
(74) *Attorney, Agent, or Firm* — Honigman LLP; Matthew H. Szalach; Jonathan P. O'Brien

(57) ABSTRACT

Several sole components and a method of manufacturing those sole components are disclosed. In general, each sole component includes a fluid-filled bladder and a reinforcing element extending around a portion of the bladder. The reinforcing element is bonded to the exterior of the bladder, and may be recessed into the bladder. In some configurations, the reinforcing element is die-cut from a sheet of polymer material, and the reinforcing element may exhibit a layered configuration. In manufacturing the sole component, the reinforcing element may be located within a mold, and the polymer material forming the bladder may be bonded to the reinforcing element during the molding process.

20 Claims, 26 Drawing Sheets

(56) References Cited

U.S. PATENT DOCUMENTS

| | | | | |
|---|---|---|---|---|
| 6,009,637 A | * | 1/2000 | Pavone | A43B 13/141 |
| | | | | 36/28 |
| 6,354,020 B1 | * | 3/2002 | Kimball | A43B 13/203 |
| | | | | 36/135 |
| 2004/0221483 A1 | * | 11/2004 | Cartier | A43B 13/125 |
| | | | | 36/27 |
| 2005/0011085 A1 | * | 1/2005 | Swigart | A43B 21/28 |
| | | | | 36/31 |
| 2005/0268490 A1 | * | 12/2005 | Foxen | A43B 7/145 |
| | | | | 36/28 |
| 2005/0268491 A1 | * | 12/2005 | McDonald | A43B 9/00 |
| | | | | 36/28 |
| 2015/0268491 A1 | * | 9/2015 | Kwon | G02F 1/133377 |
| | | | | 349/43 |

\* cited by examiner

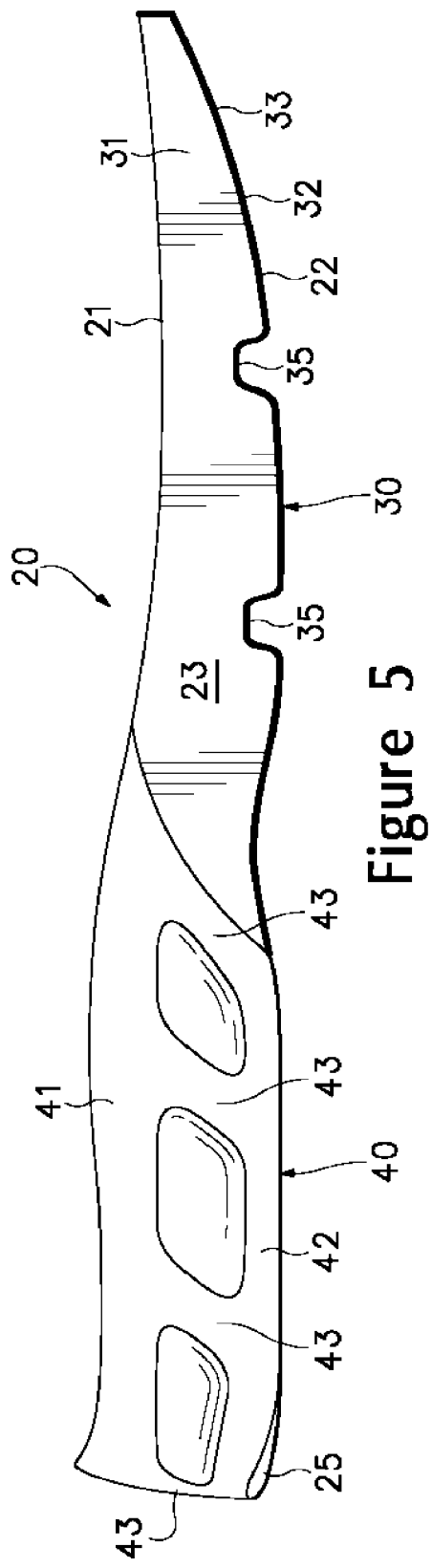
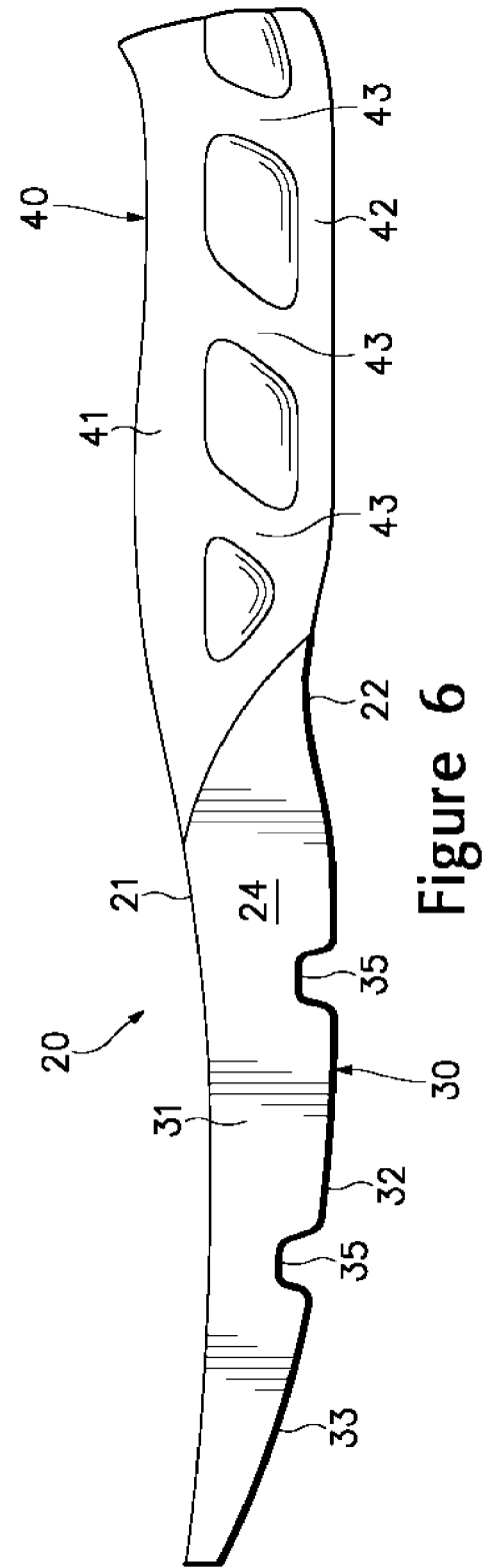

METHOD OF MANUFACTURING A FLUID-FILLED CHAMBER WITH A REINFORCING ELEMENT

CROSS-REFERENCE TO RELATED APPLICATIONS

This application is a continuation of U.S. patent application Ser. No. 16/538,342, filed Aug. 12, 2019, which is a continuation of U.S. patent application Ser. No. 15/296,192, filed Oct. 18, 2016, which is a continuation of U.S. patent application Ser. No. 14/039,713, filed on Sep. 27, 2013, which is a divisional of U.S. patent application Ser. No. 12/014,974, filed on Jan. 16, 2008, the disclosures of which are incorporated herein by reference in their entity.

BACKGROUND

A conventional article of athletic footwear includes two primary elements, an upper and a sole structure. The upper may be formed from a plurality of material elements (e.g., textiles, leather, and foam materials) defining a void that securely receives and positions the foot with respect to the sole structure. The sole structure is secured to a lower surface of the upper and is generally positioned to extend between the foot and the ground. In addition to attenuating ground reaction forces, the sole structure may provide traction and control various foot motions, such as pronation. Accordingly, the upper and the sole structure operate cooperatively to provide a comfortable structure that is suited for a wide variety of ambulatory activities, such as walking and running.

The sole structure of an article of athletic footwear generally exhibits a layered configuration that includes a comfort-enhancing insole, a resilient midsole formed from polymer foam, and a ground-contacting outsole that provides both abrasion-resistance and traction. Suitable polymer foam materials for the midsole include ethylvinylacetate or polyurethane that compress resiliently under an applied load to attenuate ground reaction forces. Conventional polymer foam materials compress resiliently, in part, due to the inclusion of a plurality of open or closed cells that define an inner volume substantially displaced by gas. Following repeated compressions, the cell structure of the polymer foam may deteriorate, thereby resulting in an decreased compressibility and decreased force attenuation characteristics of the sole structure.

One manner of reducing the mass of a polymer foam midsole and decreasing the effects of deterioration following repeated compressions is disclosed in U.S. Pat. No. 4,183,156 to Rudy, in which cushioning is provided by a fluid-filled chamber formed of an elastomeric material. The chamber includes a plurality of subchambers that are in fluid communication and jointly extend along a length and across a width of the footwear. The chamber may be encapsulated in a polymer foam material, as disclosed in U.S. Pat. No. 4,219,945 to Rudy. The combination of the chamber and the encapsulating polymer foam material functions as a midsole. Accordingly, the upper is attached to the upper surface of the polymer foam material and an outsole is affixed to the lower surface.

Fluid-filled chambers suitable for footwear applications may be manufactured by a two-film technique, in which two separate sheets of elastomeric film are formed to exhibit the overall peripheral shape of the chamber. The sheets are then bonded together along their respective peripheries to form a sealed structure, and the sheets are also bonded together at predetermined interior areas to give the chamber a desired configuration. That is, interior bonds (i.e., bonds spaced inward from the periphery) provide the chamber with a predetermined shape and size upon pressurization. In order to pressurize the chamber, a nozzle or needle connected to a fluid pressure source is inserted into a fill inlet formed in the chamber. Following pressurization of the chamber, the fill inlet is sealed and the nozzle is removed. A similar procedure, referred to as thermoforming, may also be utilized, in which a heated mold forms or otherwise shapes the sheets of elastomeric film during the manufacturing process.

Chambers may also be manufactured by a blow-molding technique, wherein a molten or otherwise softened elastomeric material in the shape of a tube is placed in a mold having the desired overall shape and configuration of the chamber. The mold has an opening at one location through which pressurized air is provided. The pressurized air induces the liquefied elastomeric material to conform to the shape of the inner surfaces of the mold. The elastomeric material then cools, thereby forming a chamber with the desired shape and configuration. As with the two-film technique, a nozzle or needle connected to a fluid pressure source is inserted into a fill inlet formed in the chamber in order to pressurize the chamber. Following pressurization of the chamber, the fill inlet is sealed and the nozzle is removed.

SUMMARY

An article of footwear having an upper and a sole structure is disclosed. The sole structure includes a chamber and a reinforcing element. The chamber encloses a fluid, and at least a portion of an exterior surface of the chamber may be formed from a first polymer material. The reinforcing element has a first surface and an opposite second surface. The first surface may be at least partially formed from the first polymer material and bonded to the exterior surface of the chamber. The second surface is at least partially formed from a second polymer material, the first polymer material being different than the second polymer material.

A method of manufacturing a sole structure for an article of footwear is also disclosed. The method includes die-cutting a reinforcing element from a planar sheet of polymer material, the reinforcing element having a first surface and an opposite second surface. The reinforcing element is located within a mold such that the second surface contacts a surface of the mold. The chamber may also be shaped by drawing a polymer material against the surface of the mold and against the first surface of the reinforcing element.

The advantages and features of novelty characterizing aspects of the invention are pointed out with particularity in the appended claims. To gain an improved understanding of the advantages and features of novelty, however, reference may be made to the following descriptive matter and accompanying drawings that describe and illustrate various configurations and concepts related to the invention.

DESCRIPTION OF THE DRAWINGS

The foregoing Summary and the following Detailed Description will be better understood when read in conjunction with the accompanying drawings.

FIG. 5 is a lateral side elevational view of the sole component.

FIG. 6 is a medial side elevational view of the sole component.

DETAILED DESCRIPTION

The following discussion and accompanying figures disclose various sole component configurations suitable for footwear applications. In addition, methods of manufacturing the sole components are disclosed. Concepts related to the sole components and manufacturing methods are disclosed with reference to an article of footwear having a configuration that is suitable for running. The sole components are not limited solely to footwear designed for running, and may be applied to a wide range of athletic footwear styles, including basketball shoes, cross-training shoes, walking shoes, tennis shoes, soccer shoes, and hiking boots, for example. The sole component may also be applied to footwear styles that are generally considered to be non-athletic, including dress shoes, loafers, sandals, and work boots. The concepts disclosed herein apply, therefore, to a wide variety of footwear styles.

Figure 1:
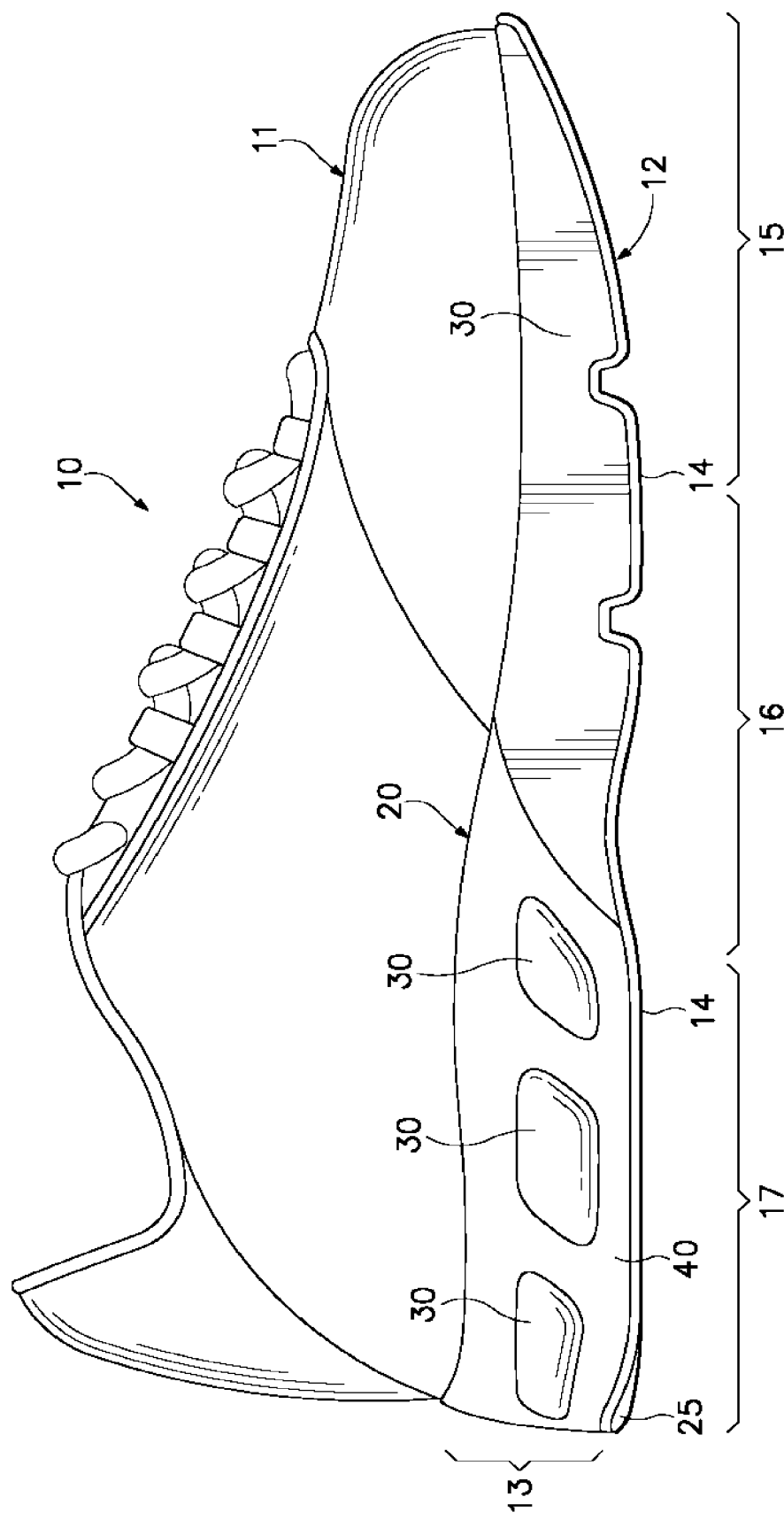
FIG. 1 is a lateral side elevational view of the article of footwear incorporating a sole component.
Figure 2:
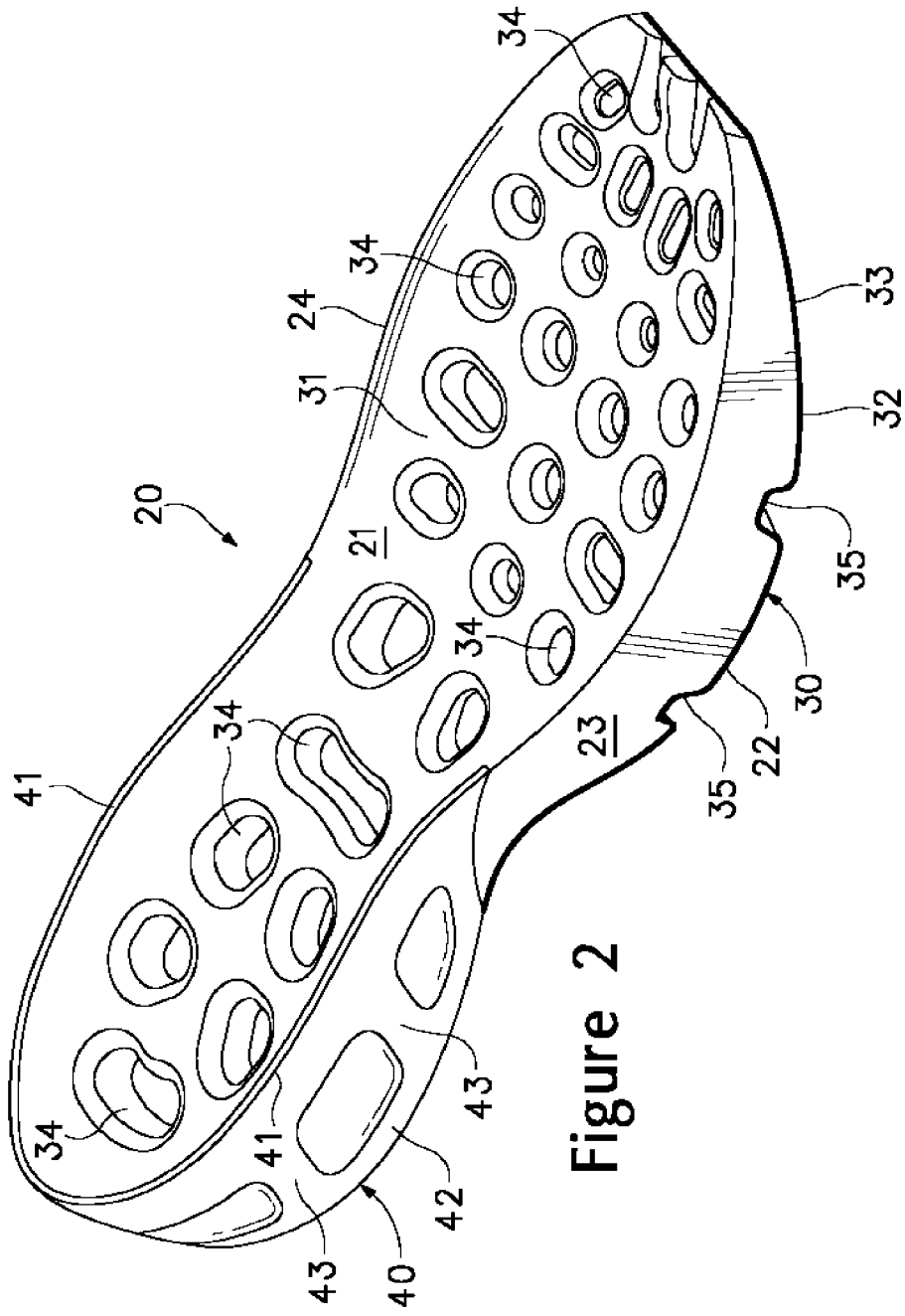
FIG. 2 is a perspective view of the sole component.

An article of footwear 10 is depicted in FIG. 1 as including an upper 11 and a sole structure 12. Upper 11 may incorporate a plurality of material elements (e.g., textiles, foam, and leather) that are stitched or adhesively bonded together to form an interior void for securely and comfortably receiving a foot. The material elements may be selected and located with respect to upper 11 in order to selectively impart properties of durability, air-permeability, wear-resistance, flexibility, and comfort, for example. In addition, upper 11 may include a lace that is utilized in a conventional manner to modify the dimensions of the interior void, thereby securing the foot within the interior void and facilitating entry and removal of the foot from the interior void. The lace may extend through apertures in upper 11, and a tongue portion of upper 11 may extend between the interior void and the lace. Accordingly, upper 11 may have a substantially conventional configuration.

Sole structure 12 is secured to upper 11 and includes a midsole 13 and an outsole 14. A conventional midsole may be primarily formed of a polymer foam material, such as polyurethane or ethylvinylacetate, as discussed in the Background section. In contrast with the structure of the conventional midsole, midsole 13 incorporates a sole component 20, as depicted in FIGS. 2-7C, that includes a fluid-filled bladder 30 and an external reinforcing element 40. Sole component 20 provides ground reaction force attenuation (i.e., cushioning) as footwear 10 impacts the ground during running, walking, or other ambulatory activities. In addition, sole component 20 may impart stability or otherwise control foot motions, such as the degree of pronation. Outsole 14 is secured to a lower surface of midsole 13 and is formed of a durable, wear-resistant material suitable for engaging the ground. Sole structure 12 may also include an insole with the configuration of a thin cushioning member that is positioned within the interior void formed by upper 11 and located to contact a plantar surface of the foot, thereby enhancing the overall comfort of footwear 10.

The following discussion references various general regions of footwear 110, upper 11, and sole structure 12 based upon their relative locations. For reference purposes, footwear 10 may be divided into three general regions: a forefoot region 15, a midfoot region 16, and a heel region 17, as depicted in FIG. 1. Forefoot region 15 generally includes portions of footwear 10 corresponding with the toes and the joints connecting the metatarsals with the phalanges. Midfoot region 16 generally includes portions of footwear 10 corresponding with the arch area of the foot, and heel region 17 corresponds with rear portions of the foot, including the calcaneus bone. Regions 15-17 are not intended to demarcate precise areas of footwear 10. Rather, regions 15-17 are intended to represent general areas of footwear 10 to aid in the following discussion. In addition to footwear 10, regions 15-17 may also be applied to upper 11, sole structure 12, and individual elements thereof.

Sole Component Structure

Sole component 20 includes an upper surface 21 and an opposite lower surface 22. Upper surface 21 is secured to upper 11 in a conventional manner, such as adhesive bonding, and may be contoured to conform to the shape of the plantar surface of the foot. Accordingly, upper surface 21 may exhibit an elevation in heel region 17 that is greater than an elevation in forefoot region 15, with midfoot region 16 forming a transition between the elevations. Differences in the overall thickness of sole component 20 may account for the elevation in heel region 17 that is greater than the elevation in forefoot region 15. The overall shape of sole component 20, as depicted in the plan view of FIG. 4, corresponds with a shape of a foot. Accordingly, a width of heel region 17 may be less than a width of forefoot region 15 to accommodate the varying width dimensions of the foot. Outsole 14 is also secured to lower surface 22 in a conventional manner, such as adhesive bonding. In addition to upper surface 21 and lower surface 22, sole component 20 includes a lateral side surface 23 and an opposite medial side surface 24. Both side surfaces 23 and 24 are exposed portions of midsole 13 and have a tapered configuration from heel region 17 to forefoot region 15 that facilitates the difference in elevation between heel region 17 and forefoot region 15.

The primary elements of sole component 20 are a fluid-filled bladder 30 and an external reinforcing element 40. Bladder 30 is formed from an upper barrier layer 31 and a lower barrier layer 32 that are substantially impermeable to a pressurized fluid contained by bladder 30. Upper barrier layer 31 and lower barrier layer 32 are bonded together around their respective peripheries to form a peripheral bond 33 and cooperatively form a sealed chamber, in which the pressurized fluid is located. The pressurized fluid contained by bladder 30 induces an outward force upon barrier layers 31 and 32 that tends press outward upon barrier layers 31 and 32, thereby distending barrier layers 31 and 32. In order to restrict the degree of outwardly-directed swelling (i.e., distension) of barrier layers 31 and 32 due to the outward force of the pressurized fluid, a plurality of interior bonds 34 are formed between barrier layers 31 and 32. Interior bonds 34 are spaced inward from side surfaces 23 and 24, and interior bonds 34 are distributed throughout sole component 20. In the absence of interior bonds 34, the outward force induced by the pressurized fluid would impart a rounded or otherwise bulging configuration to bladder 30, particularly in areas corresponding with upper surface 21 and lower surface 22. Interior bonds 34, however, restrict the degree of the outwardly-directed swelling or distension of barrier layers 31 and 32 and retain the intended contours of upper surface 21 and lower surface 22.

Interior bonds 34 may exhibit a variety of configurations. In heel region 17, the indentations formed by interior bonds 34 have a greater depth than in forefoot region 15 due to the increased overall thickness of sole component 20 in heel region 17. In addition, the area of each interior bond 34 in heel region 17 is generally greater than the area of each interior bond 34 in forefoot region 15. The position of interior bonds 34 with respect to upper surface 21 and lower surface 22 may also vary. For example, interior bonds 34 may be positioned so as to be closer to upper surface 21, midway between surfaces 21 and 22, or at a position that is closer to lower surface 22. Although interior bonds 34 are depicted as being generally horizontal in FIGS. 7A-7C, interior bonds 34 may also be inclined in some configurations of sole component 20.

During running or walking, sole component 20 generally flexes or otherwise bends to accommodate the natural flexing of the foot, particularly in forefoot region 15. In order to facilitate the flexing of sole component 20, a pair of flexion indentations 35 are formed in bladder 30. Each flexion indentation 35 extends laterally across a lower portion of bladder 30. That is, flexion indentations 35 extend between side surfaces 23 and 24, and flexion indentations 35 are formed in lower surface 22. The location of flexion indentations 35 is also selected based upon the average location of the joints between the metatarsals and the proximal phalanges of the foot. More particularly, flexion indentations 35 are spaced such that one flexion indentation 35 is located forward of the joints between the metatarsals and the proximal phalanges and the other flexion indentation 35 is located behind the joints between the metatarsals and the proximal phalanges. The specific locations of flexion indentations 35 may be selected, for example, to be three standard deviations away from the average position of the joints between the metatarsals and the proximal phalanges, as determined through statistical anatomical data. Depending upon the specific configuration and intended use of sole component 20, however, the location of flexion indentations 35 may vary significantly from the positions discussed above.

Flexion indentations 35 extend laterally (i.e., between side surfaces 23 and 24) across lower surface 22. Although this configuration is suitable for footwear structured for running and a variety of other athletic activities, flexion indentations 35 may extend in a generally longitudinal direction (i.e., between forefoot region 15 and heel region 17) in footwear structured for athletic activities such as basketball, tennis, or cross-training. Accordingly, flexion indentations 35 may extend in a variety of directions in order to provide a defined line of flexion in sole component 20. The figures also depict flexion indentations 35 as extending entirely across bladder 30. In some configurations, however, flexion indentations 35 may extend only partially across bladder 30.

Flexion indentations 35 define portions of sole component 20 that have a reduced thickness. Given that the degree of force necessary to bend an object is at least partially dependent upon the thickness of the object, the reduced thickness of sole component 20 in the areas of flexion indentations 35 facilitates flexing. In addition, portions of outsole 14 may extend into flexion indentations 35, thereby forming stiffer, less compressible areas of sole structure 12 that also facilitate flexing about flexion indentations 35.

Figure 7A:
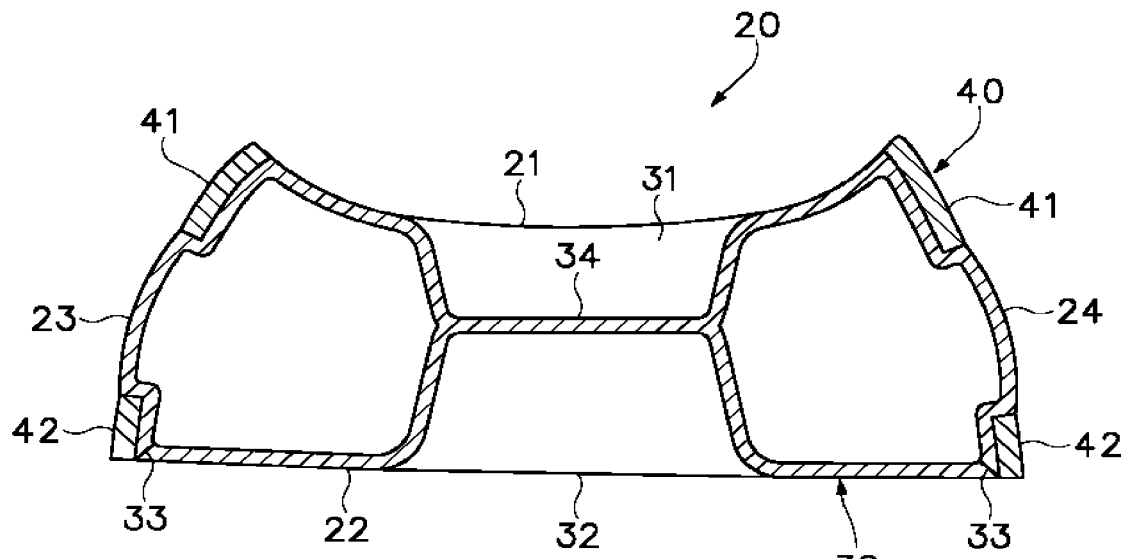
FIGS. 7A-7C are cross-sectional views of the sole component, as defined by section lines 7A-7C in FIG. 4.
Figure 7B:
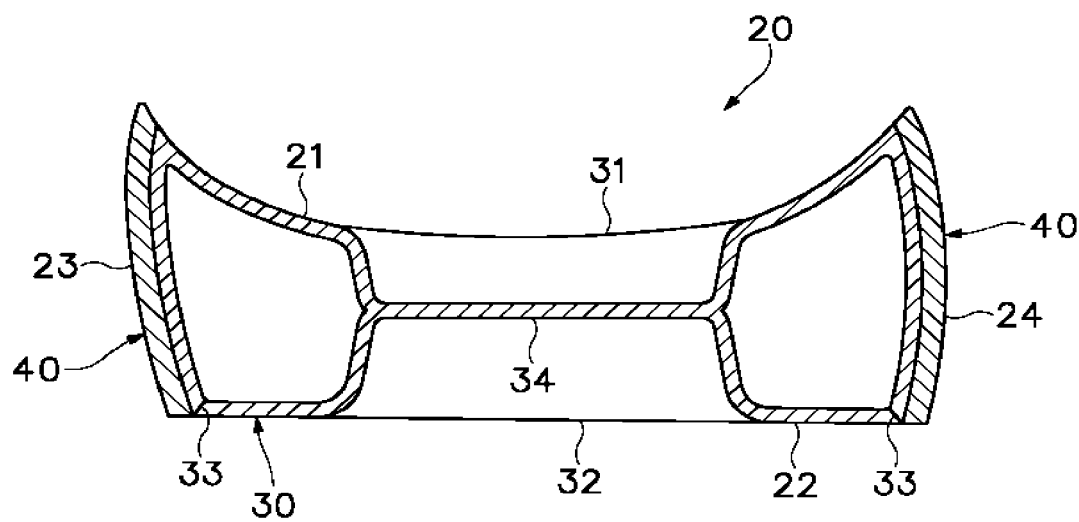
Figure 7C:
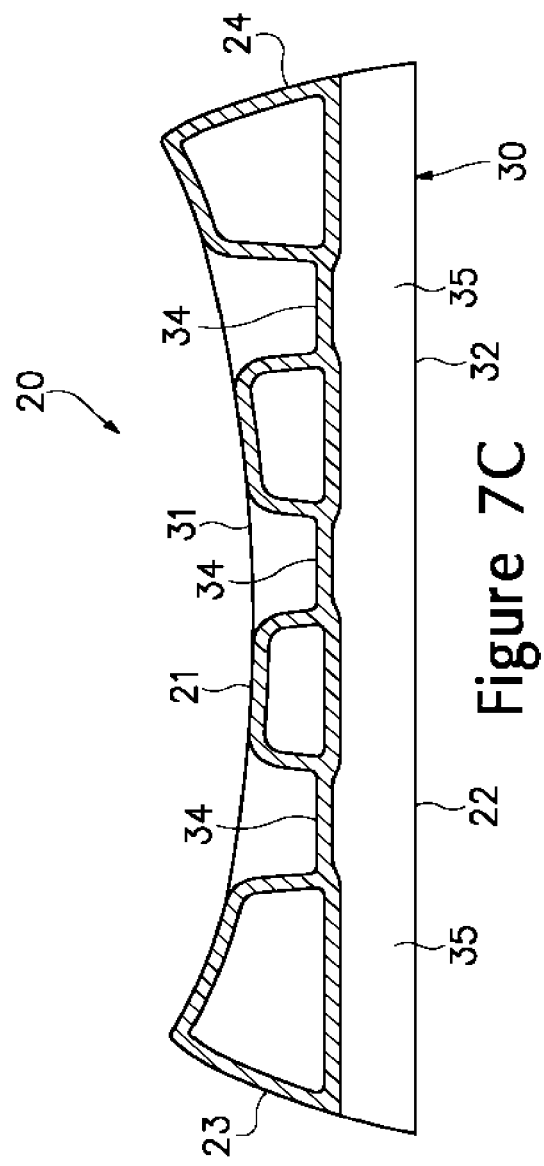

Flexion indentations 35 form an indentation in lower surface 22 that corresponds with the locations of various interior bonds 34. Referring to FIG. 7C, a cross-section through one of flexion indentations 35 is depicted. With respect to this area, interior bonds 34 extend downward to bond upper barrier layer 31 with the portion of lower barrier layer 32 that defines the flexion indentation 35. Some prior art bladders incorporate bonds that form flexion points, and the flexion points may form relatively hard areas due to the lack of a fluid cushion in the area of the flexion points. That is, the flexion points generally form non-cushioning areas of the prior art bladders. In contrast with the prior art flexion points, a space is formed between flexion indentations 35 and upper barrier layer 31 that includes the fluid such that flexion indentations 35 provide an advantage of simultaneously accommodating flexing and providing ground reaction force attenuation. As an alternative, no interior bonds 34 may be formed in areas that define flexion indentations 35.

A variety of thermoplastic polymer materials may be utilized for bladder 30, and particularly barrier layers 31 and 32, including polyurethane, polyester, polyester polyurethane, and polyether polyurethane. Another suitable material for bladder 30 is a film formed from alternating layers of thermoplastic polyurethane and ethylene-vinyl alcohol copolymer, as disclosed in U.S. Pat. Nos. 5,713,141 and 5,952,065 to Mitchell et al, incorporated herein by reference. A variation upon this material wherein the center layer is formed of ethylene-vinyl alcohol copolymer; the two layers adjacent to the center layer are formed of thermoplastic polyurethane; and the outer layers are formed of a regrind material of thermoplastic polyurethane and ethylene-vinyl alcohol copolymer may also be utilized. Bladder 30 may also be formed from a flexible microlayer membrane that includes alternating layers of a gas barrier material and an elastomeric material, as disclosed in U.S. Pat. Nos. 6,082,025 and 6,127,026 to Bonk et al., both incorporated herein by reference. In addition, numerous thermoplastic urethanes may be utilized, such as PELLETHANE, a product of the Dow Chemical Company; ELASTOLLAN, a product of the BASF Corporation; and ESTANE, a product of the B.F. Goodrich Company, all of which are either ester or ether based. Still other thermoplastic urethanes based on polyesters, polyethers, polycaprolactone, and polycarbonate macrogels may be employed, and various nitrogen blocking materials may also be utilized. Additional suitable materials are disclosed in U.S. Pat. Nos. 4,183,156 and 4,219,945 to Rudy, incorporated herein by reference. Further suitable materials include thermoplastic films containing a crystalline material, as disclosed in U.S. Pat. Nos. 4,936,029 and 5,042,176 to Rudy, incorporated herein by reference, and polyurethane including a polyester polyol, as disclosed in U.S. Pat. Nos. 6,013,340; 6,203,868; and 6,321,465 to Bonk et al., also incorporated herein by reference.

The fluid within bladder 30 may be any of the gasses disclosed in U.S. Pat. No. 4,340,626 to Rudy, incorporated herein by reference, such as hexafluoroethane and sulfur hexafluoride, for example. The fluid may also include gasses such as pressurized octafluoropropane, nitrogen, or air. In addition to gasses, various gels or liquids may be sealed within bladder 30. Accordingly, a variety of fluids are suitable for bladder 30. With regard to pressure, a suitable fluid pressure is fifteen pounds per square inch, but may range from zero to thirty pounds per square inch. Accordingly, the fluid pressure within bladder 30 may be relatively high, or the fluid pressure may be at ambient pressure or at a pressure that is slightly elevated from ambient in some configurations.

Interior bonds 34, as discussed above, are spaced inward from side surfaces 23 and 24 to restrict the degree of outwardly-directed swelling (i.e., distension) of barrier layers 31 and 32, particularly in areas corresponding with upper surface 21 and lower surface 22. Interior bonds 34 may not, however, significantly restrict the outwardly-directed swelling of side surfaces 23 and 24. One purpose of reinforcing element 40 is, therefore, to restrict the degree of outwardly-directed swelling in side surfaces 23 and 24, thereby retaining the intended overall shape of sole component 20.

Reinforcing element 40 includes an upper portion 41, a lower portion 42, and a plurality of connecting portions 43. When incorporated into sole component 20, reinforcing element 40 exhibits a generally U-shaped configuration. Upper portion 41 is positioned at the interface of upper surface 21 and side surfaces 23 and 24. Accordingly, upper portion 41 extends along lateral side 23 from midfoot region 16 to heel region 17, extends around heel region 17, and also extends along medial side 24 from midfoot region 16 to heel region 17. Lower portion 42 is positioned at the interface of lower surface 22 and side surfaces 23 and 24. Lower portion 42 extends through heel region 17 and may extend into rearward portions of midfoot region 16. Connecting portions 43 extend along side surfaces 23 and 24 and also extend in a diagonal direction between upper portion 41 and lower portion 42. More particularly, connecting portions 43 exhibit a forwardly-inclined configuration, but may also be substantially vertical or rearwardly-inclined.

Upper portion 41, lower portion 42, and connecting portions 43 collectively form a plurality of apertures that expose portions of bladder 30. The apertures extend along side surfaces 23 and 24 in at least heel region 17, and the shape of the apertures generally depends upon the orientations of connecting portions 43 and the configurations of upper portion 41 and lower portion 42. The apertures formed through reinforcing element 40 are depicted as having the shape of a parallelogram, but may have a variety of shapes that include, for example, oval, hexagon, triangle, circle, or various non-geometric shapes. The shape of the apertures may affect the compression characteristics of reinforcing element 40 and may be selected, therefore, to provide particular properties to reinforcing element 40.

Figure 3:
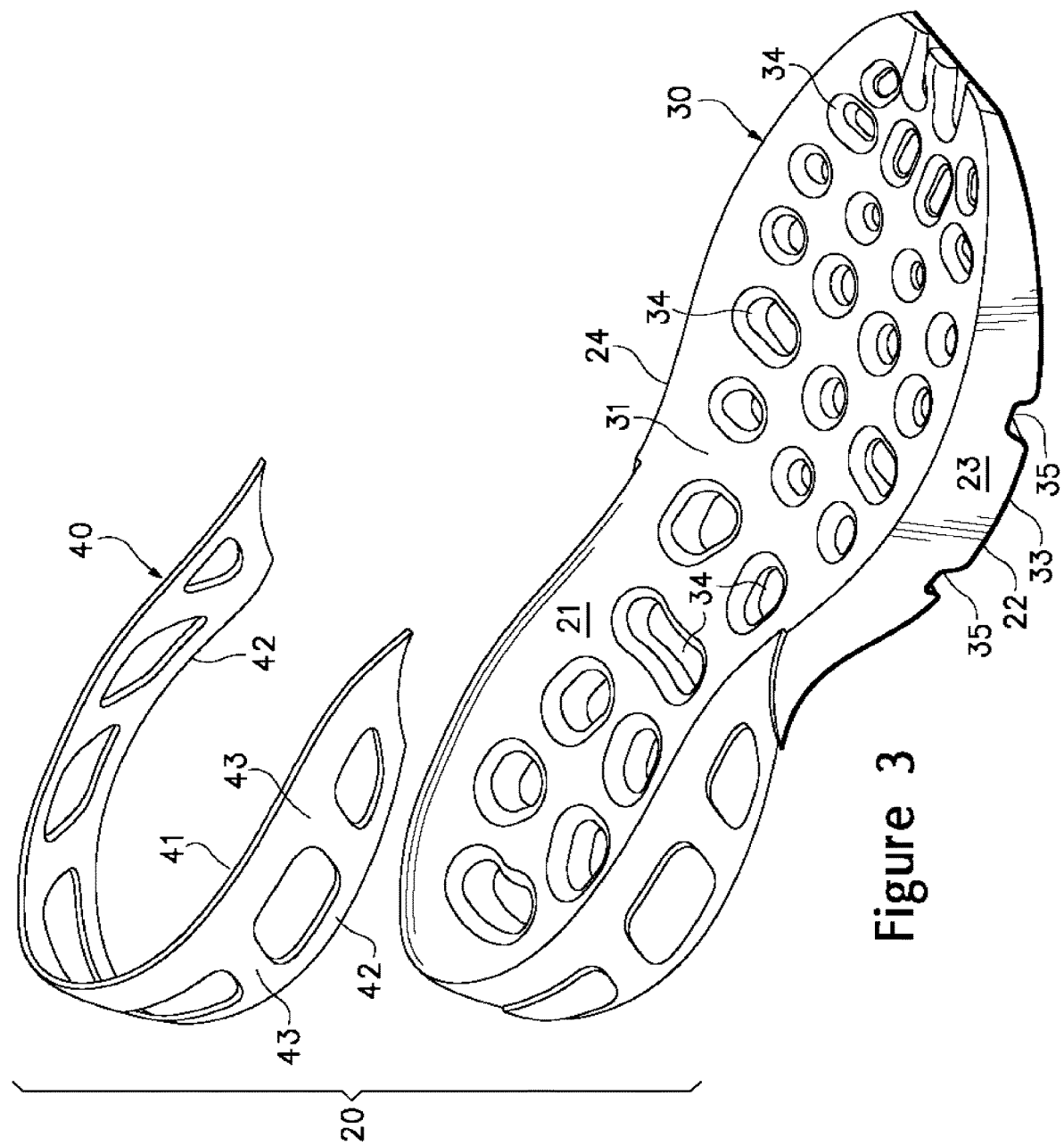
FIG. 3 is an exploded perspective view of the sole component.
Figure 4:
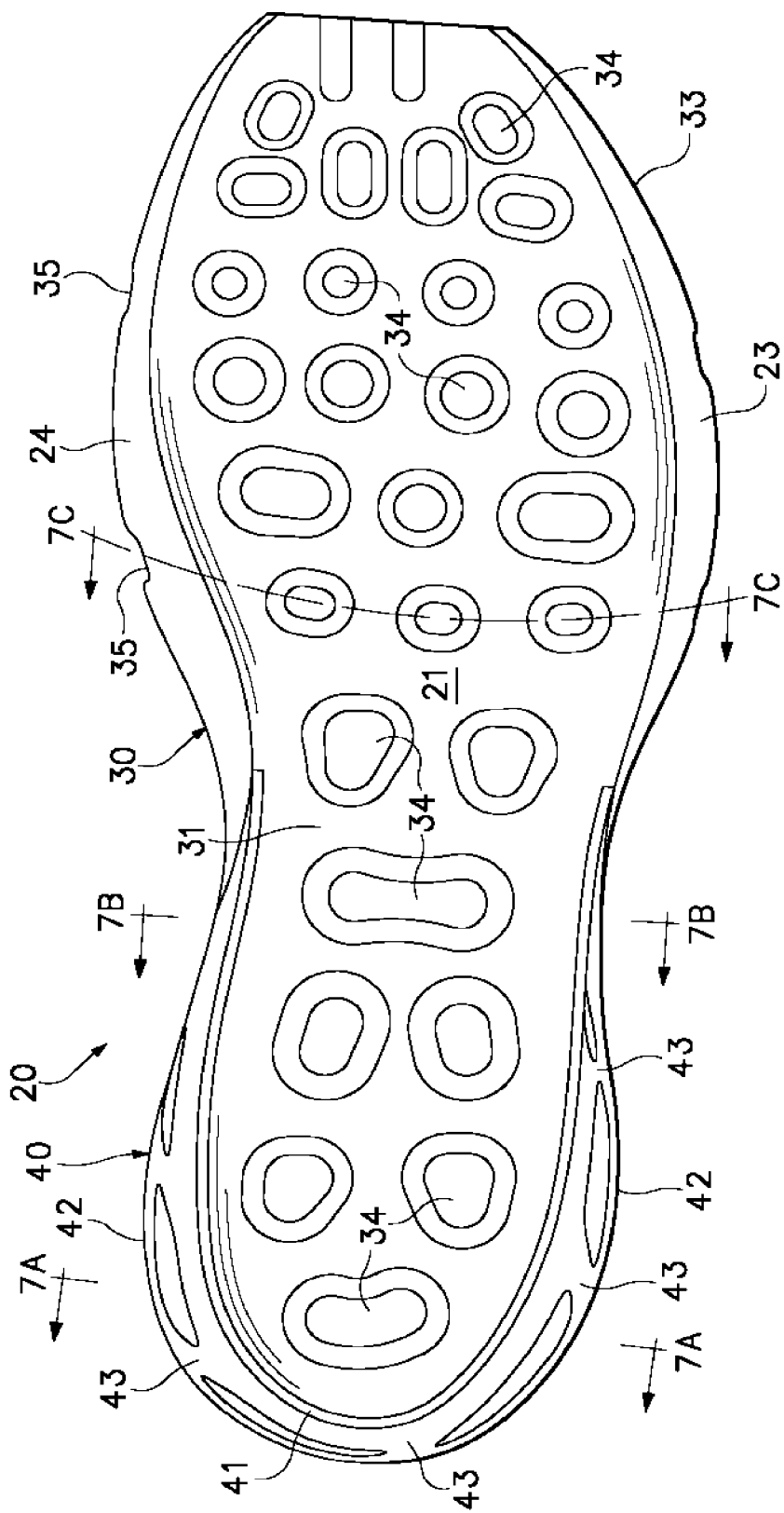
FIG. 4 is a top plan view of the sole component.

Reinforcing element 40 restricts the degree of outwardly-directed swelling in side surfaces 23 and 24, thereby retaining the intended overall shape of sole component 20. That is, the pressurized fluid within bladder 30 presses outward upon barrier layers 31 and 32, and reinforcing element 40 restrains the distension in side surfaces 23 and 24 due to the pressure of the fluid. Portions of reinforcing element 40 may, therefore, placed in tension by the pressurized fluid. Although upper portion 41 and lower portion 42 may experience such tension, connecting portions 43, which extend along side surfaces 23 and 24, may generally experience greater degrees of tension. Accordingly, connecting portions 43 may be placed in tension by the fluid pressure and operate to restrict the degree of outwardly-directed swelling or distension in side surfaces 23 and 24. As shown in FIG. 3 bladder 230 may have recessed portions in side surfaces 23 and 24 to receive reinforcing element 40 and allow closer contact between the bladder 30 and reinforcing element 40.

The specific configuration of reinforcing element 40 discussed above is intended to provide an understanding of reinforcing element 40 according to one configuration, and as depicted in FIGS. 2-7C. In further configurations, however, the configuration of reinforcing element 40 may be significantly modified. For example, upper portion 41 may extend into forefoot region 15, may extend over portions upper surface 21, or may extend be absent from portions of regions 16 and 17. Similarly, lower portion 42 may extend through each of regions 15-17, or lower portion 42 may extend over portions of lower surface 22. The numbers and dimensions of connecting portions 43 may also vary significantly. Accordingly, reinforcing element 40 may have a variety of configurations.

Reinforcing element 40 is recessed into bladder 30 such that an outward-facing surface of reinforcing element 40 is generally flush with surfaces 21-24 of bladder 30. Referring to FIGS. 7A-7C, the outward-facing surfaces of connecting portion 43 are generally flush with side surfaces 23 and 24. Accordingly, side surfaces 23 and 24 form recesses that receive connecting portions 43. While the figures show squared edges where contact is made with bladder 30, reinforcing element 40 have beveled edges. Forming the various outward-facing surfaces of reinforcing element 40 to be generally flush with surfaces 21-24 of bladder 30 has an advantage of providing a smooth exterior configuration to sole component 20. In some configurations, however, the outward-facing surfaces of reinforcing element 40 may be inset or recessed into bladder 30 or may protrude outward beyond bladder 30.

A die-cutting process or molding process, for example, may be utilized to form reinforcing element 40 from a diverse range of materials. Suitable materials for reinforcing element 40 include polyester, thermoset urethane, thermoplastic urethane, thermoplastic polyurethane, various nylon formulations, blends of these materials, or blends that include glass fibers. In addition, reinforcing element 40 may be formed from a high flex modulus polyether block amide, such as PEBAX, which is manufactured by the Atofina Company. Polyether block amide provides a variety of characteristics that benefit reinforcing element 40, including high impact resistance at low temperatures, few property variations in the temperature range of minus 40 degrees Celsius to positive 80 degrees Celsius, resistance to degradation by a variety of chemicals, and low hysteresis during alternative flexure. Another suitable material for reinforcing element 40 is a polybutylene terephthalate, such as HYTREL, which is manufactured by E.I. duPont de Nemours and Company. Composite materials may also be formed by incorporating glass fibers or carbon fibers into the polymer materials discussed above in order to enhance the strength of reinforcing element 40.

Although reinforcing element 40 may be formed from a single material, two or more materials may be incorporated into reinforcing element 40 in some configurations. One possibility is to make a laminate material where there are different material layers. This would allow the inside portion of reinforcing element 40 (i.e., the portion adjacent to bladder 30) to have one set of properties, and the outside portion of reinforcing element 40 (i.e., the portion facing outward from footwear 10) to have a different set of properties, depending on the materials chosen. For example, the inside portion of reinforcing element 40 could have a layer that facilitates bonding to bladder 30, and the outside portion may be formed from a durable and wear-resistant material. More particularly, the portion of reinforcing element 40 that contacts and bonds with bladder 30 may be formed from the same material as bladder 30 to facilitate bonding, and the portion of reinforcing element 40 that faces away from bladder 30 may be formed from a different material.

The material forming reinforcing element 40 may exhibit a greater modulus of elasticity than the material forming bladder 30. Whereas the material forming bladder 30 is generally flexible, the material forming reinforcing element 40 may exhibit semi-rigid or rigid properties. Comparisons between bladder 30 and reinforcing element 40 may also relate to the melting point and recrystalization temperatures. As discussed in greater detail below, materials forming bladder 30 and reinforcing element 40 are joined through a molding process. Although the melting point and recrystalization temperatures of bladder 30 and reinforcing element 40 may vary significantly, a difference in melting points that is less than 35 degrees Celsius and a difference in recrystalization temperatures that is at least 5 degrees Celsius may be beneficial to the manufacturing process. In some configurations, the ultimate tensile strength of the material forming bladder 30 may be less than the ultimate tensile strength of the material forming reinforcing element 40.

Sole component 20, as described above, provides ground reaction force attenuation as footwear 10 impacts the ground during running, walking, or other ambulatory activities. In addition, sole component 20 may impart stability or otherwise control foot motions, such as the degree of pronation. The degree of ground reaction force attenuation provided by sole component 20, and the manner in which sole component 20 controls foot motions, are primarily determined by the configuration of both bladder 30 and reinforcing element 40 and the properties of the materials forming bladder 30 and reinforcing element 40. Accordingly, variations in the configuration of both bladder 30 and reinforcing element 40, and the materials utilized therein, may be employed to tune or otherwise control the ground reaction force attenuation and motion control properties of sole structure 12.

As an additional matter, lower surface 22 forms an upwardly-beveled area 25 in a rear-lateral portion of sole component 20 in order to permit the footwear to smoothly roll both forward and to the medial side following heel strike. As depicted in FIGS. 1 and 5, the vertical thicknesses of the portions of bladder 30 and reinforcing element 40 forming lateral side surface 23 decrease in rear portions of heel region 17. The rationale for the decreased thickness, which forms beveled area 25, corresponds with the typical motion of the foot during running, which proceeds as follows: Initially, the heel strikes the ground, followed by the ball of the foot. As the heel leaves the ground, the foot rolls forward so that the toes make contact, and finally the entire foot leaves the ground to begin another cycle. During the time that the foot is in contact with the ground and rolling forward, it also rolls from the outside or lateral side to the inside or medial side, a process called pronation. While the foot is air-borne and preparing for another cycle, the opposite process, called supination, occurs. An advantage of beveled area 25 is to permit footwear 10 to smoothly transition from the position at heel strike, wherein only the rear-lateral portion of sole structure 12 is in contact with the ground, to the position where a substantial portion of outsole 14 is in contact with the ground. That is, beveled area 25 permits footwear 10 to smoothly roll both forward and to the medial side following heel strike. Furthermore, the positions of connecting portions 43 are selected such that a space is formed between two adjacent connecting portions 43 at the location of beveled area 25. The space between adjacent connecting portions 43 further facilitates a smooth transition from the position at heel strike by providing greater compressibility to sole component 20 at the position of beveled area 25.

Manufacturing Process for the Sole Component

Figure 8A:
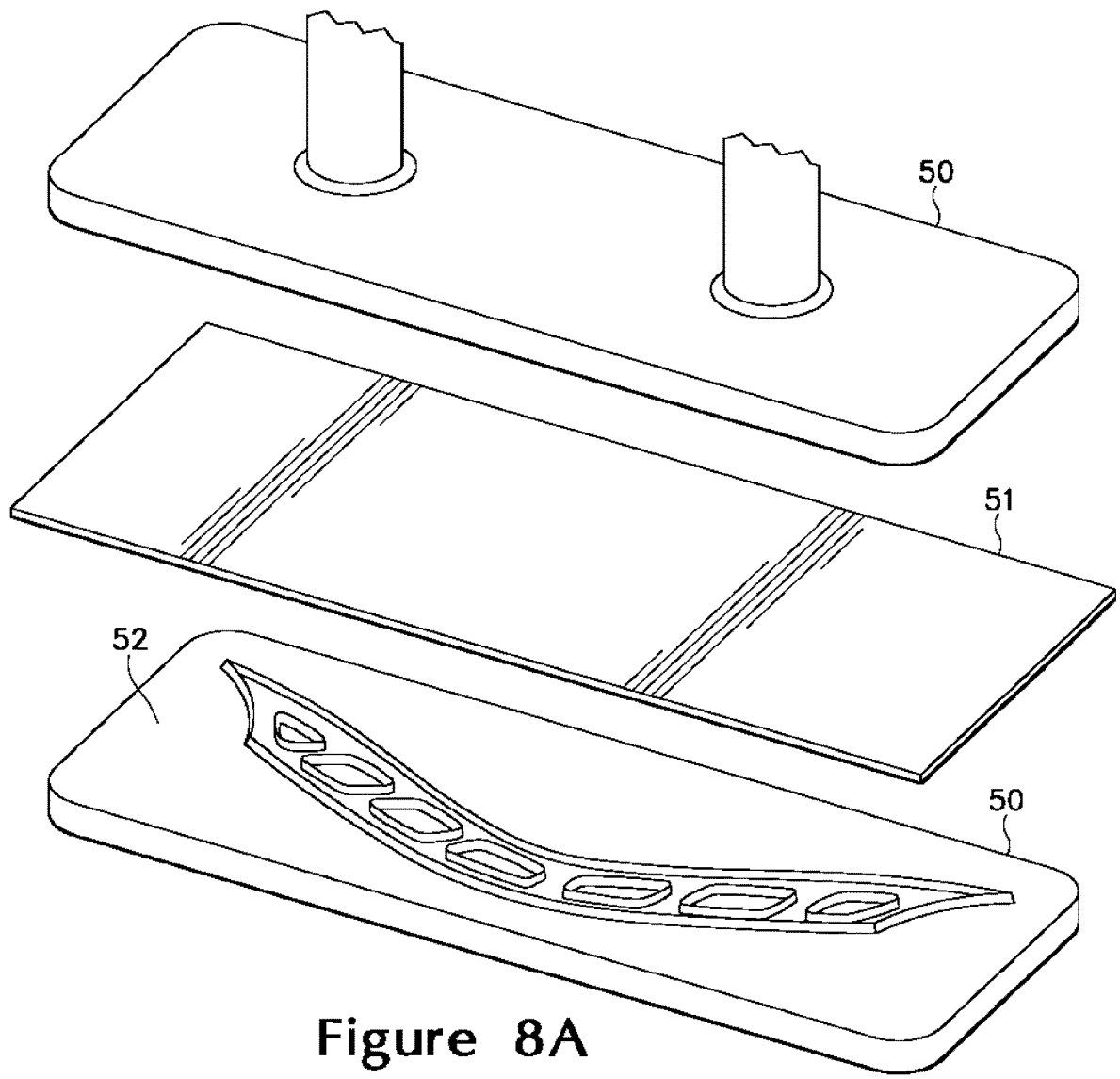
FIGS. 8A-8C are schematic perspective views depicting a method of forming a reinforcing element of the sole component.
Figure 8B:
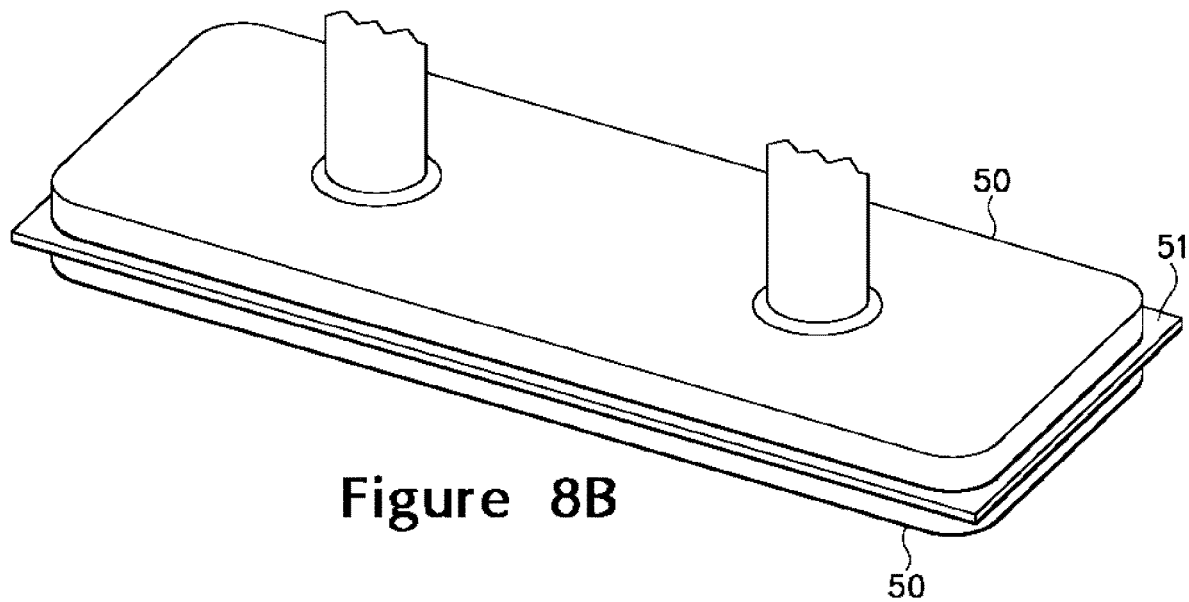
Figure 8C:
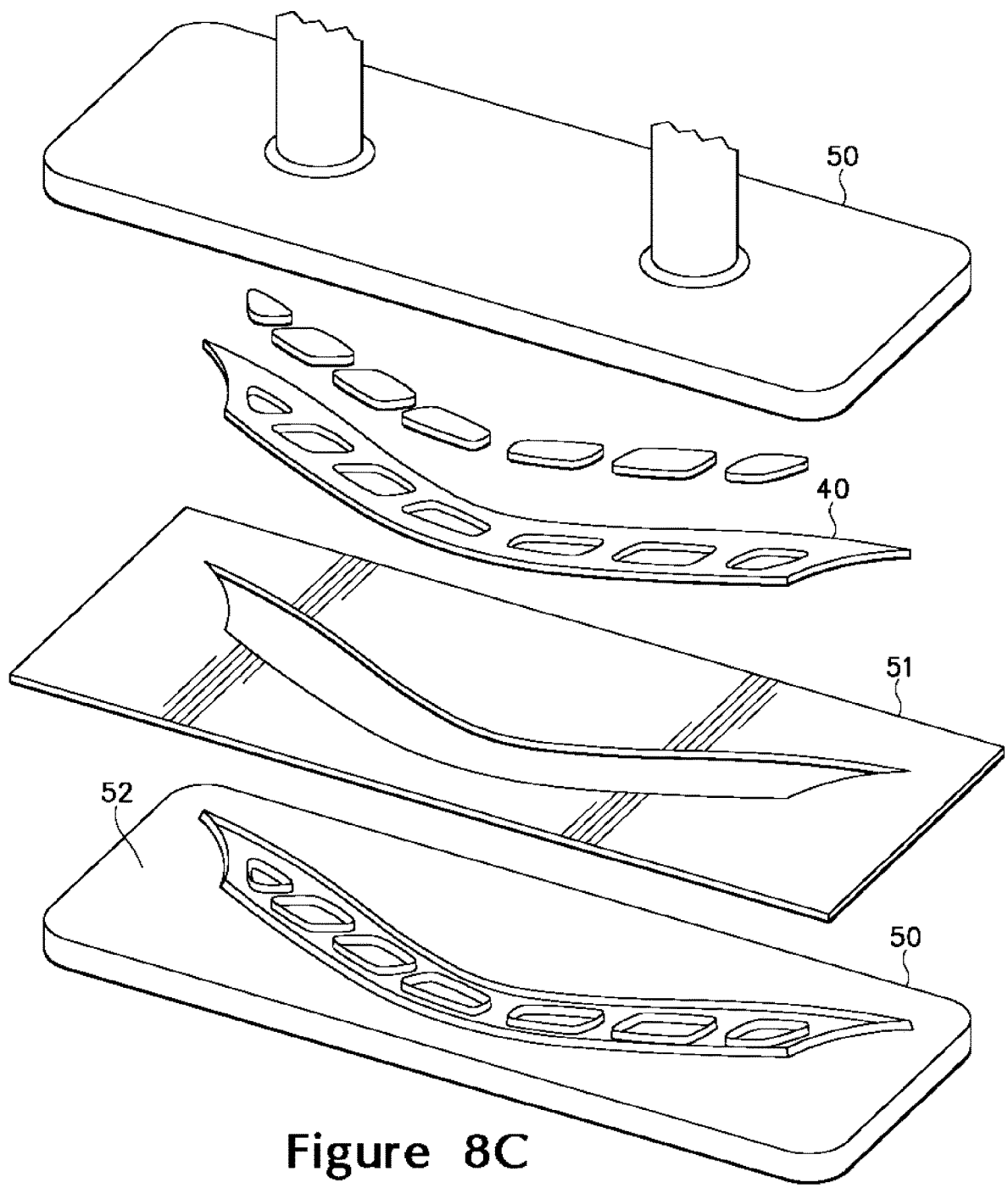

One suitable manufacturing process for sole component 20 begins with the formation of the reinforcing element 40. Although a variety of techniques may be utilized, reinforcing element 40 may be die-cut from sheet stock, which enhances the efficiency of manufacturing footwear 10 by eliminating the need for separate molds and molding operations. More particularly, a sheet 51 that forms reinforcing element 40 may be placed between opposing portions of a die-cutting apparatus 50, as depicted in FIG. 8A. As apparatus 50 compresses sheet 51, as depicted in FIG. 8B, edges on a cutting surface 52 of apparatus 50 having the shape of reinforcing element 40 may extend though and cut sheet 51. Following the opening of apparatus 50, as depicted in FIG. 8C, reinforcing element 40 may be removed. Additional milling may be required to add beveled edges or other modifications to the basic shape. Reinforcing element 40 may then be cleansed with a detergent or alcohol, for example, in order to remove surface impurities, such as dust or fingerprints. The surface of reinforcing element 40 may also be plasma treated to enhance bonding with bladder 30.

Following the formation of reinforcing element 40, a mold is utilized to form bladder 30 and bond reinforcing element 40 to bladder 30. The mold includes an upper mold portion 60 and a corresponding lower mold portion 70, which are respectively depicted in FIGS. 9A and 9B. When joined together, mold portions 60 and 70 form a cavity having dimensions substantially equal to the exterior dimensions of sole component 20. The mold may be utilized for thermoforming bladder 30 and simultaneously bonding or otherwise securing reinforcing element 40 to the exterior of bladder 30. In general, reinforcing element 40 is placed within upper mold portion 60 and two thermoplastic polymer sheets are placed between mold portions 60 and 70. The thermoplastic sheets are then drawn into the contours of the mold such that at least one of the thermoplastic sheets contacts and is bonded to reinforcing element 40. In addition, mold portions 60 and 70 compress the thermoplastic sheets together to form peripheral bond 33. Once the thermoplastic sheets have conformed to the shape of bladder 30, reinforcing element 40 is bonded to the thermoplastic sheets, peripheral bond 33 is formed, and bladder 30 may be pressurized with a fluid and sealed, thereby forming sole component 20.

Figure 9A:
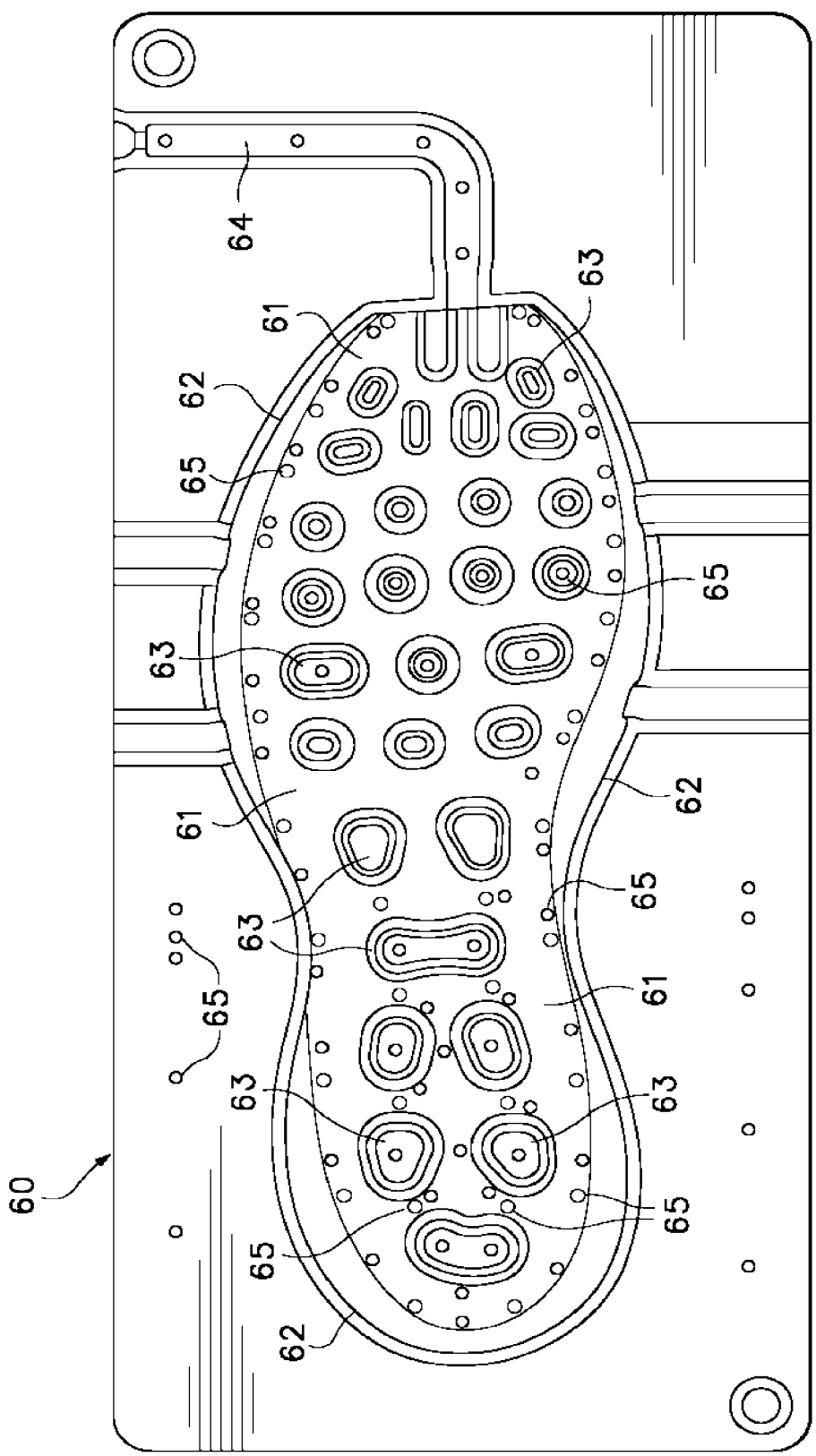
FIGS. 9A and 9B are plan views of portions of a mold for manufacturing the sole component.

Upper mold portion 60 is depicted individually in FIG. 9A and includes a cavity 61 that forms the portions of sole component 20 corresponding with upper surface 21 and side surfaces 23 and 24. A ridge 62 extends around cavity 61 and is partially responsible for forming peripheral bond 33. In addition, a plurality of protrusions 63 extend from a surface of cavity 61 and are partially responsible for forming interior bonds 34. Accordingly, the area of upper mold portion 60 located within the area bounded by ridge 62 forms upper surface 21 and side surfaces 23 and 24. An extension of ridge 62 extends outward from cavity 61 and forms an L-shaped channel 64. As discussed in greater detail below, channel 64 is utilized to form a conduit through which a fluid may be injected into sole component 20. Another feature of upper mold portion 60 is a plurality of slot vents 65 distributed throughout cavity 61. Vents 65 provide outlets for air as a thermoplastic sheet of polymer material is drawn into the contours of upper mold portion 60 during the formation of sole component 20.

Figure 9B:
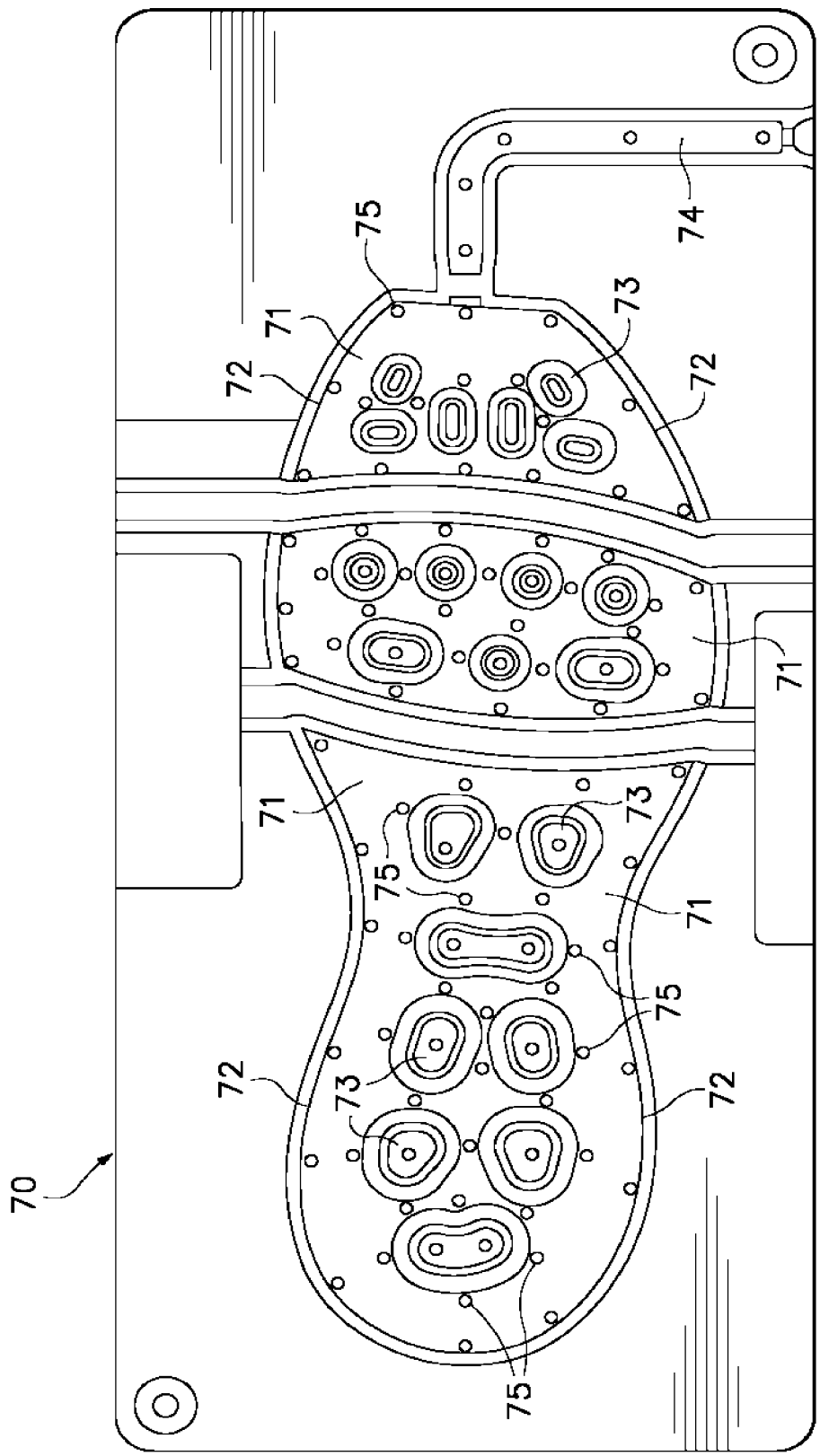

Lower mold portion 70 is depicted individually in FIG. 9B and includes a surface 71 that forms the portion of sole component 20 corresponding with lower surface 22. A ridge 72 extends around surface 71 and, in combination with ridge 62, is responsible for forming peripheral bond 33. In addition, a plurality of protrusions 73 extend from surface 71 and join with protrusions 63 to form interior bonds 34. Accordingly, the area of lower mold portion 70 located within the area bounded by ridge 72 forms lower surface 22. An extension of ridge 72 extends outward from surface 71 and forms an L-shaped channel 74. Channel 74 joins with channel 64 to form the conduit through which the fluid may be injected into sole component 20. Another feature of lower mold portion 70 is a plurality of slot vents 75 distributed throughout surface 71. Vents 75 provide outlets for air as a thermoplastic sheet of polymer material is drawn into the contours of lower mold portion 70 during the formation of sole component 20.

Figure 10A:
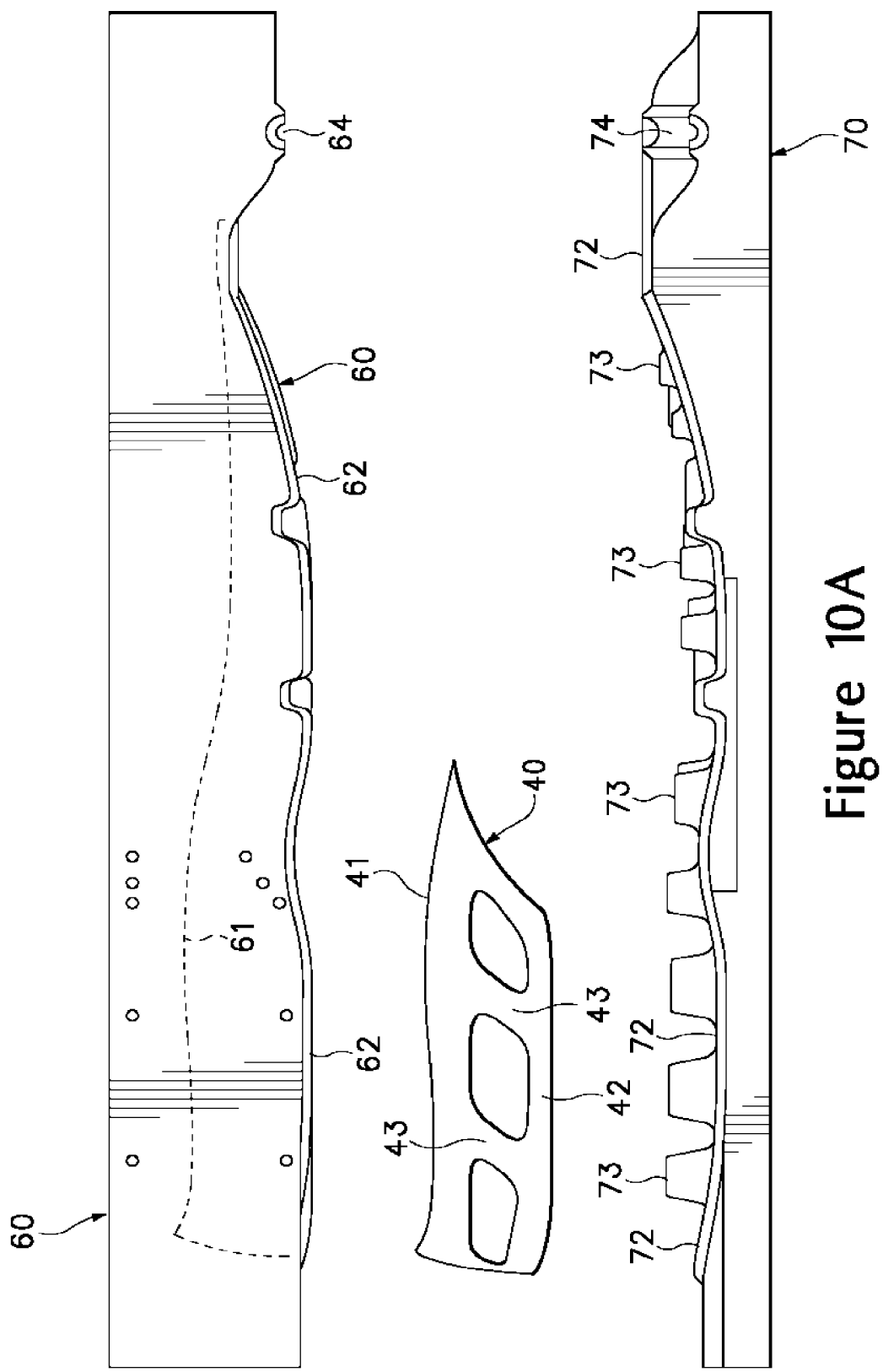
FIGS. 10A-10D are side elevational views depicting a method of manufacturing the sole component with the mold.
Figure 10B:
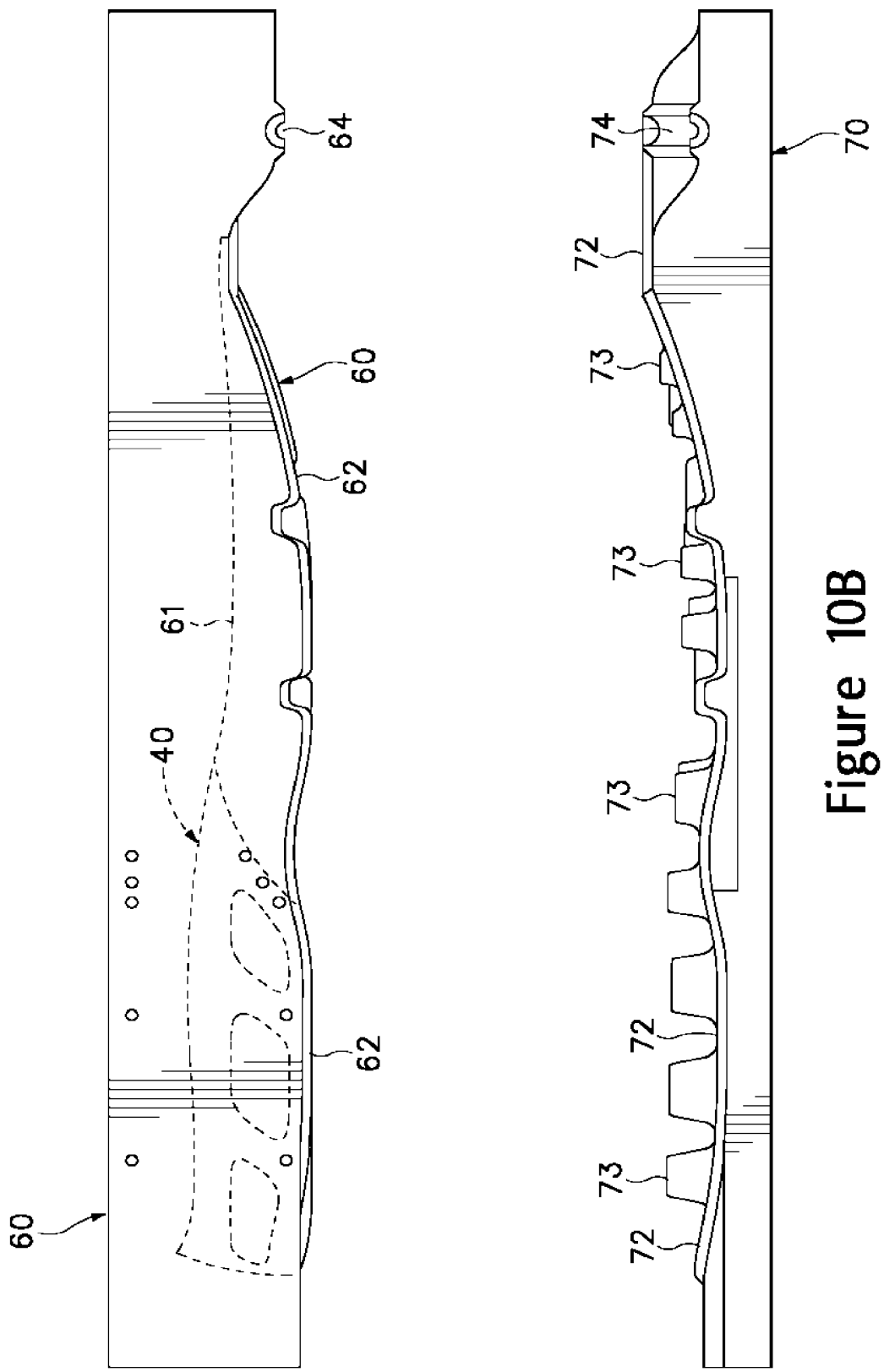

The manner in which the mold is utilized to form sole component 20 from reinforcing element 40 and barrier layers 31 and 32 will now be discussed. Initially, reinforcing element 40 is bent into a U-shape, placed between mold portions 60 and 70 and then positioned within upper mold portion 60, as depicted in FIGS. 10A and 10B, respectively. Upper mold portion 60 forms the portions of sole component 20 corresponding with upper surface 21 and side surfaces 23 and 24. In the configuration of sole component 20 discussed above, reinforcing element 40 is generally bonded to side surfaces 23 and 24. Accordingly, positioning reinforcing element 40 within upper mold portion 60, as depicted in FIG. 10B, properly positions reinforcing element 40 with respect to the mold for the process of forming sole component 20. A variety of techniques may be utilized to secure reinforcing element 40 within upper mold portion 60, including a vacuum system, various seals, or non-permanent adhesive elements, for example.

Figure 10C:
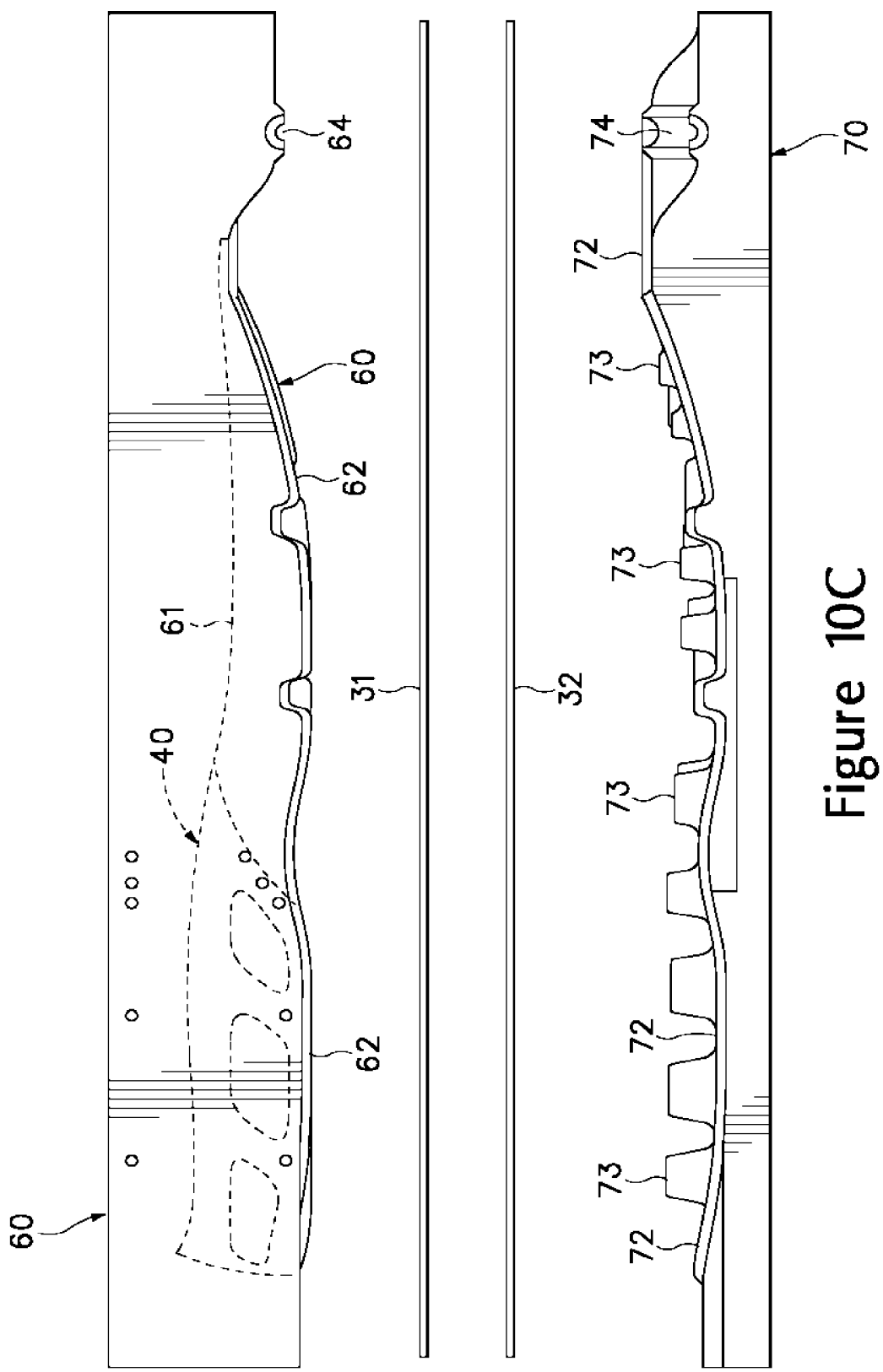

Reinforcing element 40 may conduct heat from the mold, thereby raising the temperature of reinforcing element 40. In some configurations, reinforcing element 40 may be heated prior to placement within the mold in order to decrease manufacturing times. Radiant heaters may also be utilized to heat surfaces of reinforcing element 40 while located within the mold. Following placement of reinforcing element 40 within upper mold portion 60, a pair of thermoplastic polymer sheets that form barrier layers 31 and 32 are heated and then positioned between mold portions 60 and 70, as depicted in FIG. 10C. The temperatures to which reinforcing element 40 and barrier layers 31 and 32 are heated depends upon the specific material used.

Figure 10D:
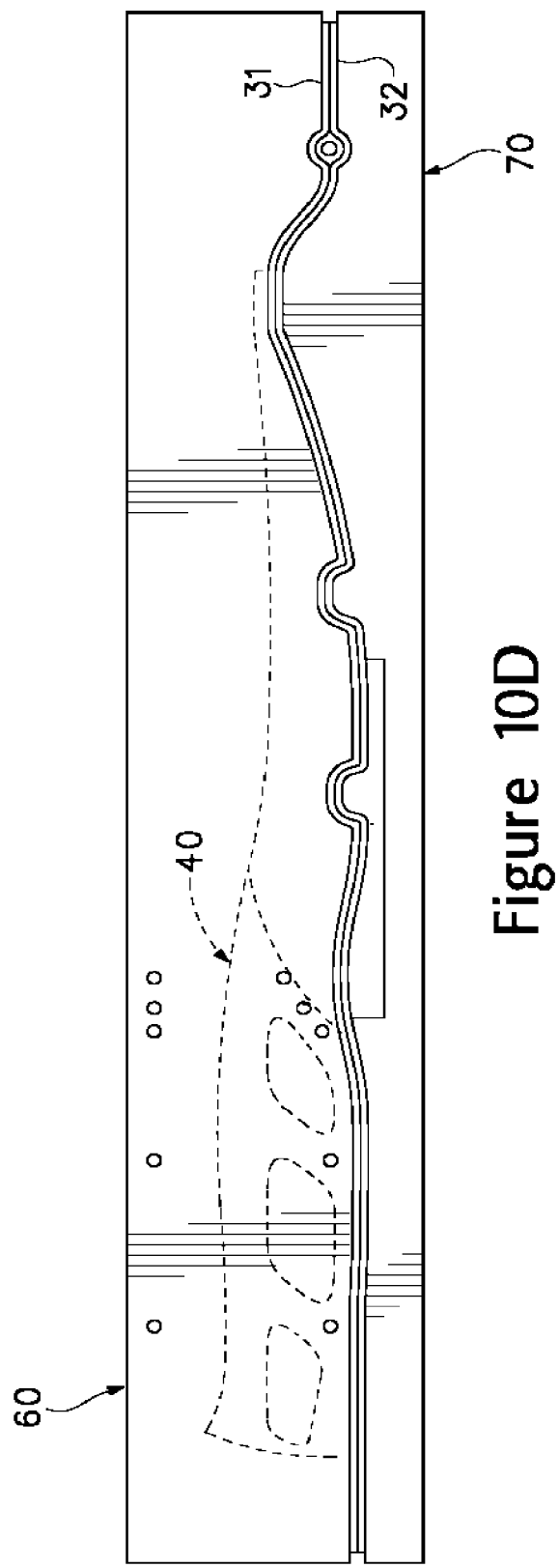

Once barrier layers 31 and 32 are positioned, mold portions 60 and 70 are then located such that ridge 62 aligns with ridge 72 and the various protrusions 63 are aligned with protrusions 73. In this position, the areas of mold portions 60 and 70 that form corresponding portions of sole component 20 are positioned on opposite sides of barrier layers 31 and 32 and are also aligned. Mold portions 60 and 70 then translate toward each other such that the mold contacts and compresses barrier layers 31 and 32, as depicted in FIG. 10D.

As the mold contacts and compresses portions of barrier layers 31 and 32, a fluid, such as air, having a positive pressure in comparison with ambient air may be injected between barrier layers 31 and 32 to induce barrier layers 31 and 32 to respectively contact and conform to the contours of mold portions 60 and 70. A variety of methods may be employed to pressurize the area between barrier layers 31 and 32. For example, the fluid may be directed through the conduit formed by channels 64 and 74. Air may also be removed from the area between barrier layers 31 and 32 and mold portions 60 and 70 through vents 65 and 75, thereby drawing barrier layers 31 and 32 onto the surfaces of mold portions 60 and 70. In addition, drawing barrier layers 31 and 32 onto the surfaces of mold portions 60 and 70 also draws barrier layers 31 and 32 into contact with reinforcing element 40. Accordingly, barrier layers 31 and 32 contact and are bonded to reinforcing element 40 during this portion of the manufacturing process.

As the area between barrier layers 31 and 32 is pressurized and air is removed from the area between barrier layers 31 and 32 and mold portions 60 and 70, barrier layers 31 and 32 conform to the shape of the mold and are bonded together. More specifically, barrier layers 31 and 32 stretch, bend, or otherwise conform to extend along the surfaces of cavity 61 and surface 71 and form the general shape of bladder 30. Ridge 62 and ridge 72 also compress a linear area of barrier layers 31 and 32 to form peripheral bond 33. In addition, barrier layers 31 and 32 conform to the shapes of protrusions 63 and 73 and are bonded together by being compressed between protrusions 63 and 73, thereby forming interior bonds 34.

Although barrier layers 31 and 32 conform to extend along the contours of cavity 81 and surface 71, upper barrier layer 31 generally does not contact the portions of cavity 61 that are covered by reinforcing element 40. Rather, upper barrier layer 31 contacts and is compressed against the inward-facing surface of reinforcing element 40, thereby bonding upper barrier layer 31 to reinforcing element 40. As barrier layers 31 and 32 conform to the shape of the mold and are bonded together, upper barrier layer 31 bends at the location of upper portion 41 to form side surfaces 23 and 24. That is, upper barrier layer 31 extends in a generally horizontal direction to form upper surface 21, and upper barrier layer 31 bends at the location of upper portion 41 to extend in a generally vertical direction and form side surfaces 23 and 24. Accordingly, upper barrier layer 31 bends during the process of molding bladder 30 in order to form upper surface 21 and side surfaces 23 and 24.

The thickness of upper barrier layer 31 prior to molding may be greater than the thickness of lower barrier layer 32. Although barrier layers 31 and 32 may exhibit different thicknesses prior to molding, each of barrier layers 31 and 32 may have a substantially uniform thickness following molding. Whereas lower barrier layer 32 only forms lower surface 22, upper barrier layer 31 forms both upper surface 21 and side surfaces 23 and 24. The rationale for the difference in thickness is that upper barrier layer 31 may stretch to a greater degree in order to form both upper surface 21 and side surfaces 23 and 24. Accordingly, differences between the original, pre-stretched thicknesses of barrier layers 31 and 32 compensate for thinning in upper barrier layer 31 that may occur when upper barrier layer 31 is stretched or otherwise distorted during the formation of upper surface 21 and side surfaces 23 and 24.

The various outward-facing surfaces of reinforcing element 40 are generally flush with some portion of surfaces 21-24 of bladder 30. As air pressurizes the area between barrier layers 31 and 32 and air is drawn out of the mold through vents 65 and 75, both upper barrier layer 31 and reinforcing element 40 are compressed against the surface of cavity 61. Upper barrier layer 31 contacts the inward-facing surface of reinforcing element 40, conforms to the shape of reinforcing element 40, extends around reinforcing element 40, and contacts the surface of cavity 61. In this manner, the surfaces of reinforcing element 40 are formed to be generally flush with surfaces 21-24 of bladder 30.

Figure 11:
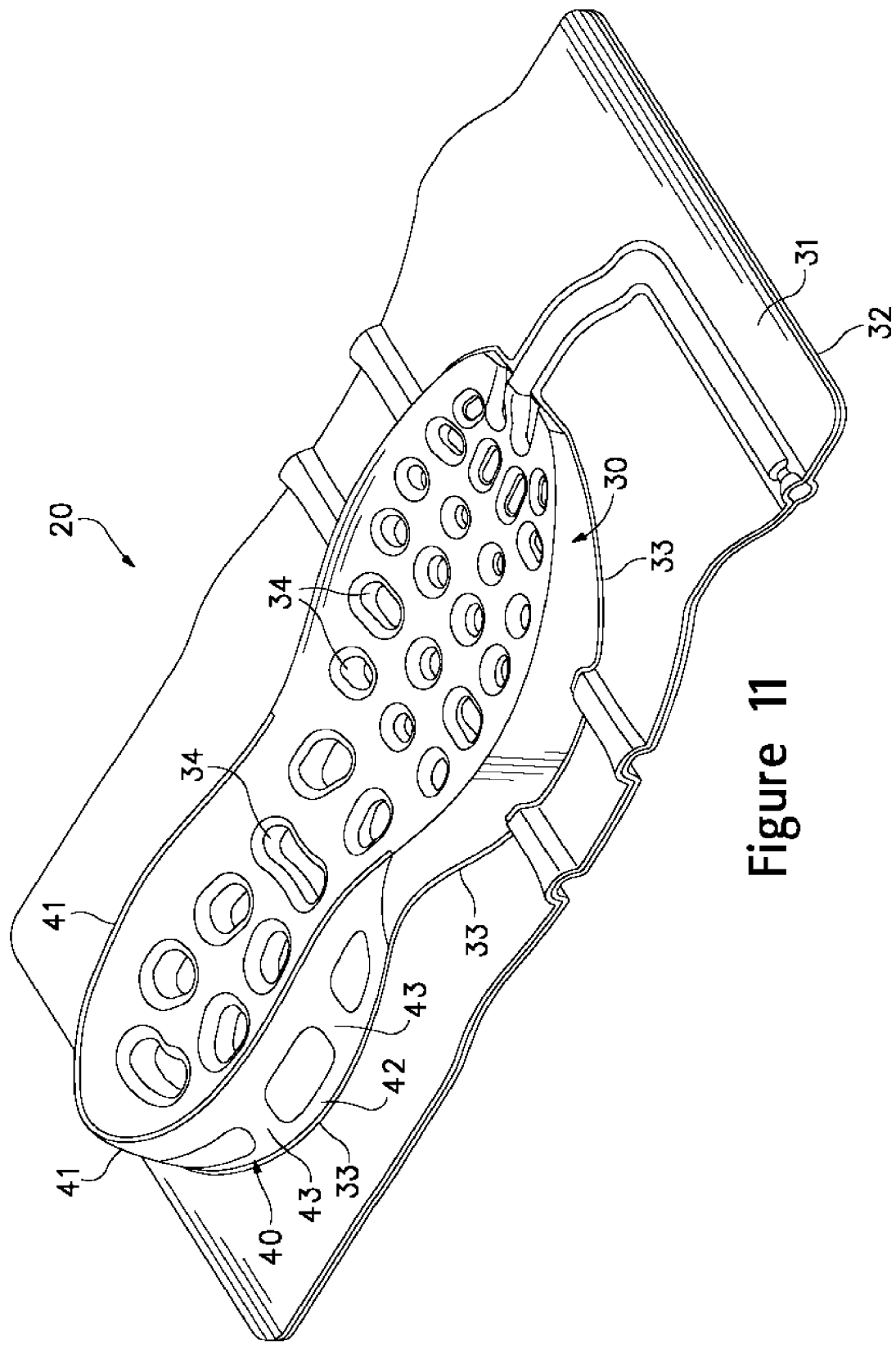
FIG. 11 is a perspective view of the sole component following removal from the mold.

Once sole component 20 is formed within the mold, mold portions 60 and 70 separate such that reinforcing element 40 and barrier layers 31 and 32 may be removed from the mold, as depicted in FIG. 11. The polymer materials forming reinforcing element 40 and barrier layers 31 and 32 are then permitted to cool and a pressurized fluid may be injected through the conduit formed by channels 64 and 74. The conduit is then sealed to enclose the fluid within bladder 30. In addition, excess portions of barrier layers 31 and 32 may be trimmed or otherwise removed from sole component 20. The excess portions may them be recycled or reutilized to form additional thermoplastic sheets.

Following the formation of sole component 20, upper 11 may be secured to upper surface 21 and outsole 14 may be secured to lower surface 22, thereby substantially completing the manufacture of footwear 10. The process of bonding outsole 14 to lower surface 22 may be performed following the formation of sole component 20, as discussed above. Alternately, one or more traction elements may be located within the mold in order to form a bond between the traction elements and lower surface 22 during the thermoforming process. That is, the traction elements may be bonded to bladder 30 through a process that is similar to the process of bonding reinforcing element 40 to bladder 30. The traction elements may be one or more elements of rubber material, for example, that are similar in configuration to a conventional outsole. The traction elements may also be additional elements of thermoplastic material that reinforce those areas of sole component 20 that contact the ground. Accordingly, the traction elements may have a variety of configurations.

Although thermoforming is a suitable manner of forming sole component 20, a blow-molding process may also be utilized. In general, a suitable blow-molding process involves positioning reinforcing element 40 within at least one of two mold portions and then positioning a parison between the mold portions. The parison is a generally hollow and tubular structure of molten polymer material. In forming the parison, the molten polymer material is extruded from a die. The wall thickness of the parison may be substantially constant, or may vary around the perimeter of the parison. Accordingly, a cross-sectional view of the parison may exhibit areas of differing wall thickness. Suitable materials for the parison include the materials discussed above with respect to bladder 30. Following placement of the parison between the mold portions, the mold portions close upon the parison and pressurized air within the parison induces the liquefied elastomeric material to contact the surfaces of the mold. In addition, closing of the mold portions and the introduction of pressurized air induces the liquefied elastomeric material to contact the surfaces of reinforcing element 40. Air may also be evacuated from the area between the parison and the mold to further facilitate molding and bonding. Accordingly, sole component 20 may also be formed through a blow molding process wherein reinforcing element 40 is placed within the mold prior to the introduction of the molten polymer material.

A variety of other manufacturing techniques may also be utilized to form sole component 20, in addition to thermoforming and blow-molding. For example, bladder 30 may be formed separate from reinforcing element 40, and both components may be subsequently bonded together. A dual-injection technique may also be utilized to simultaneously form bladder 30 and reinforcing element 40 from separate materials. In some configurations, a first element corresponding with upper surface 21 and side surfaces 23 and 24 may be formed, a second element corresponding with lower surface 22 may be joined thereto, and a third element corresponding with reinforcing element 40 may then be secured to the exterior. Accordingly, structures having the general shape and features of sole component 20 may be formed from a variety of processes.

Additional Configurations of the Sole Component

The specific configuration of sole component 20 disclosed above is intended to provide an example of a suitable structure for a sole component. In further configurations, either of bladder 30 or reinforcing element 40 may exhibit various alternate configurations. As an example, bladder 30 may be structured to have two or more subchambers. Whereas bladder 30 is disclosed above as being a single chamber that extends along the entire length of footwear 10, bladder 30 may have various subchambers that are pressurized differently and isolated from fluid communication with each other. Another configuration is possible wherein bladder 30 includes various indentions or depressions that receive side portions of outsole 14 and permit the side portions of outsole 14 to wrap upward and onto one or both of side surfaces 23 and 24. An advantage of having outsole 14 wrap upward and onto one or both of side surfaces 23 and 24 is that outsole 14 protects side surfaces 23 and 24 from contacting the ground and incurring damage. Outsole 14 may not be flush in all configurations of sole component 20.

Reinforcing element 40 may also exhibit various alternate configurations. As an example, reinforcing element 40 may form bridges that extend across upper surface 21 and between medial and lateral sides of upper portion 41 to enhance the stability of sole component 20. As with other portions of reinforcing element 40, the bridges may be recessed within indentations in bladder 30 and may be bonded to bladder 30 during the thermoforming process. Bridges may also extend across lower surface 22 or across both of surfaces 21 and 22 in any of regions 15-17. Reinforcing element 40 may also form extensions that extend upward from sole component 20 to interface with areas of upper 11. More particularly, the extensions may extend upward from reinforcing element 40 to join with upper 11. In further configurations, a portion of reinforcing element 40 may extend upward to form a heel counter, or portions of reinforcing element 40 may extend upward to form lacing members. Another configuration is that reinforcing element 40 may be formed from two or more materials. For example, upper portion 41 may be formed from a first material, while lower portion 42 and connecting portions 43 may be formed from a second material. The first material may exhibit lesser stiffness than the second material. This configuration provides a softer material adjacent to upper 11, which may enhance the comfort of footwear 10 and promote bonding between sole structure 12 and upper 11. Also, the dimensions of reinforcing element 40 may be modified to change the compressibility, stability, flexibility, reaction force attenuation properties, and the torsional resistance of sole component 20.

Sole component 20 may also include a supplemental layer that extends over lower surface 22. Modifying the thickness and placement of the supplemental layer may impart specific properties as regards stability, compression, and puncture resistance to sole component 20 and allow different configurations of sole component 20 for different needs or activities. As an alternative to the supplemental layer or in addition to the supplemental layer, outsole 14 may be structured to control the degree to which surfaces of sole component 20 compress or otherwise deform.

The stability and compressibility properties of sole component 20 may be modified by altering the configuration of interior bonds 34. In contrast with the generally horizontal configuration of interior bonds 34 depicted in FIGS. 7A-7C, alternate configurations of the bonds could be inclined or otherwise sloped. For example, interior bonds 34 can be oriented to form a downward incline extending away from each of side surfaces 23 and 24. In this configuration, the stretch in upper barrier layer 31 during the thermoforming process is lessened adjacent to side surfaces 23 and 24. Another example involves decreasing an elevation of interior bonds 34 in a central area of sole component 20. In this form, the stretch in upper barrier layer 31 is increased in the central area due to the configuration of interior bonds 34. The increased stretch in this area provides upper barrier layer 31 with lesser thickness, thereby increasing the compressibility of upper barrier layer 31 in the central area.

Figure 12A:
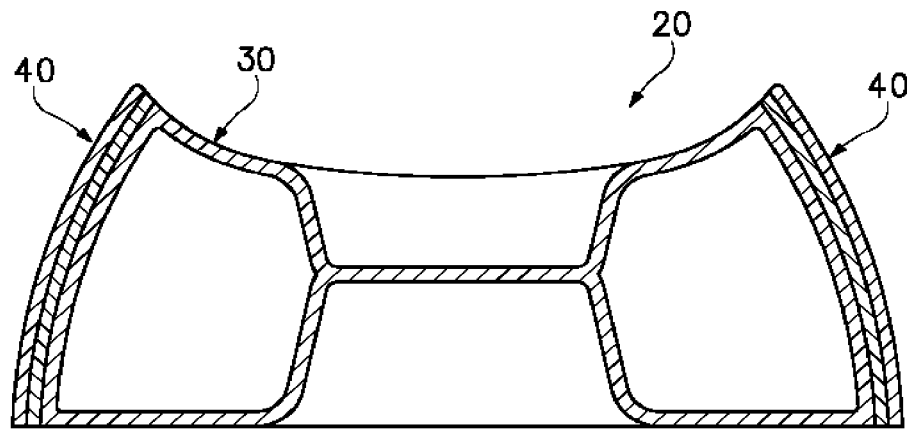
FIGS. 12A-12F are cross-sectional views corresponding with FIG. 7A and depicting additional configurations of the sole component.
Figure 12B:
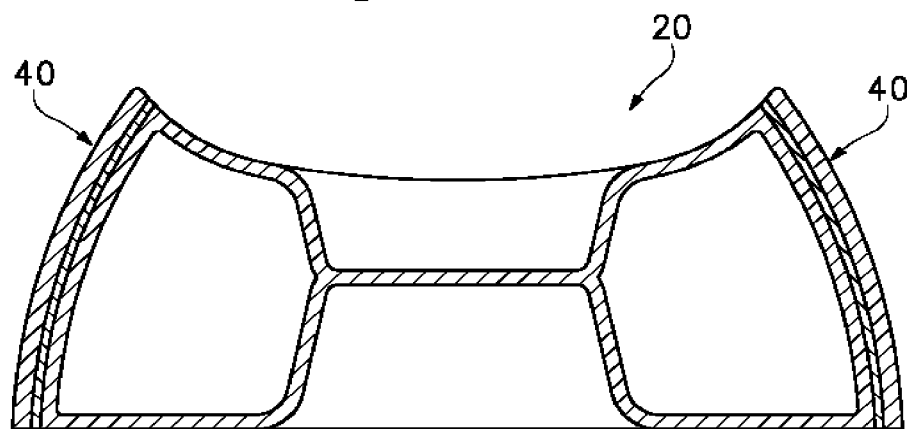

The configuration of reinforcing element 40 depicted in FIGS. 7A and 7B is formed from a single layer of material. As discussed above, however, reinforcing element 40 may be formed from multiple layers, including various laminate materials. As an example, which is depicted in FIG. 12A, reinforcing element 40 may be a laminate formed from two layers of equal thickness. Different thickness ratios may also be used. For example, FIG. 12B depicts a layered configuration wherein each of the layers have a different thickness. More particularly, a thickness of the interior layer is approximately one-half a thickness of the exterior layer. Other thickness ratios or even additional layers within the laminate are also possible.

An advantage to forming reinforcing element 40 with a layered configuration may be to impart different properties to the inside and outside of reinforcing element 40. For example, the interior layer may be formed from a material that readily bonds to bladder 30, and the exterior layer may be formed from a material that resists wear or imparts greater stability to sole component 20. In some configurations, the interior layer may be formed from the same material as bladder 30. When, for example, the interior layer of reinforcing element 40 and bladder 30 are both formed from the same thermoplastic polymer material, then the bonding affinity between reinforcing element 40 and bladder 30 may be increased. As another example, the exterior layer may be formed from a material (e.g., a metal or a textured or colored polymer) that imparts a particular aesthetic aspect to footwear 10, whereas the interior layer may be a material that bonds with bladder 30. Accordingly, forming reinforcing element 40 to have a layered configuration may be utilized to impart the properties of two different materials to sole component 20.

Figure 12C:
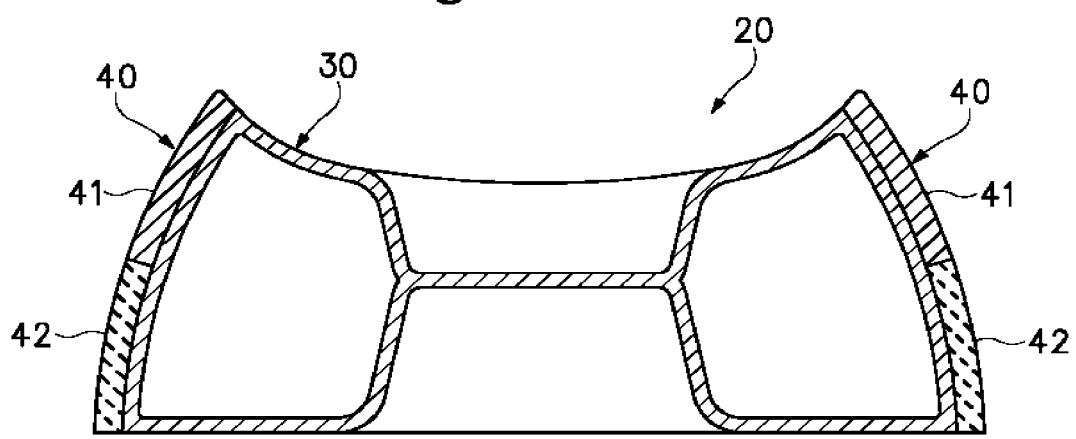
Figure 12D:
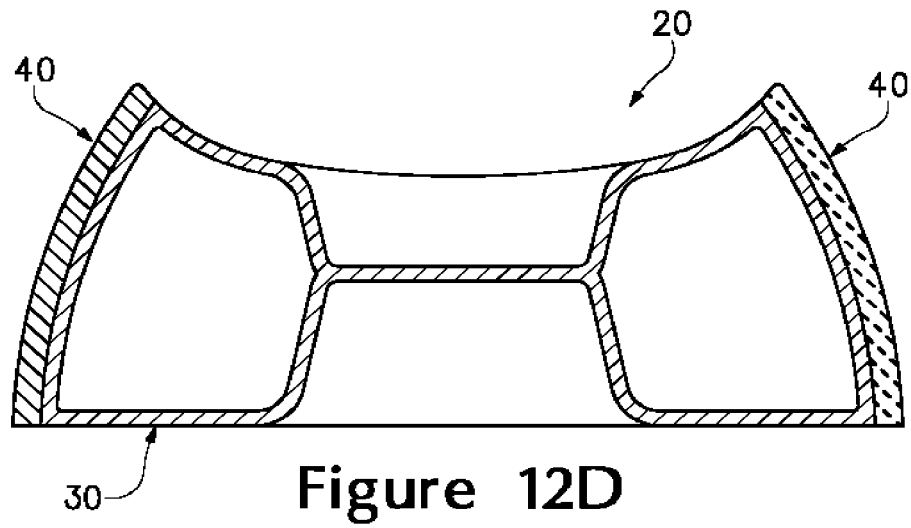

Additionally, other portions of reinforcing element 40 may be made from differing materials. For example, as shown in FIG. 12C, upper portion 41 may be formed from a material that exhibits lesser stiffness than a material forming lower portion 42. This configuration provides a softer material adjacent to upper 11, which may enhance the comfort of footwear 10 and promote bonding between sole structure 12 and upper 11. In addition, some configurations may vary the materials throughout reinforcing element 40 in order to provide specific compression, stability, and flexibility properties to particular portions of reinforcing element 40. An example is shown in FIG. 12D, wherein a medial side of reinforcing element 40 is formed from a different material than a lateral side of reinforcing element 40. An advantage to structuring sole component 20 to exhibit lesser medial compressibility may be to reduce the degree of pronation in the foot. Accordingly, forming reinforcing element 40 from different materials in various areas may be utilized to impart different properties to the various areas.

Figure 12E:
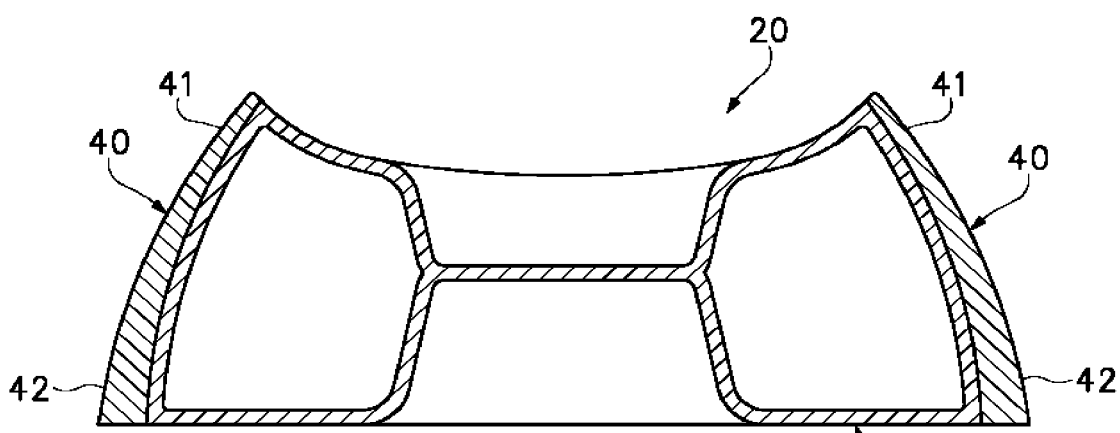
Figure 12F:
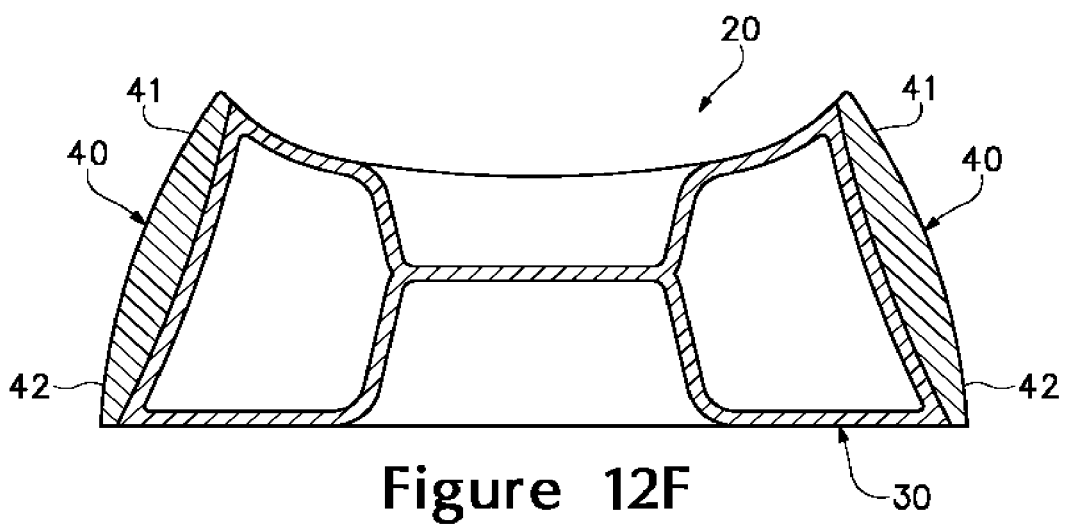

The compressibility of peripheral areas of sole component 20 may be selected through modifications in the overall thickness of reinforcing element 40. As depicted in FIG. 12E, the thickness of reinforcing element 40 may be tapered between upper portion 41 and lower portion 42 in order to control the compressibility of reinforcing element 40 or limit the degree to which reinforcing element 40 creases or buckles during compression. In addition, a central area of reinforcing element 40 may exhibit a greater thickness than portions 41 and 42 in order to impart a specific compressibility, as shown in FIG. 12F.

Figure 13A:
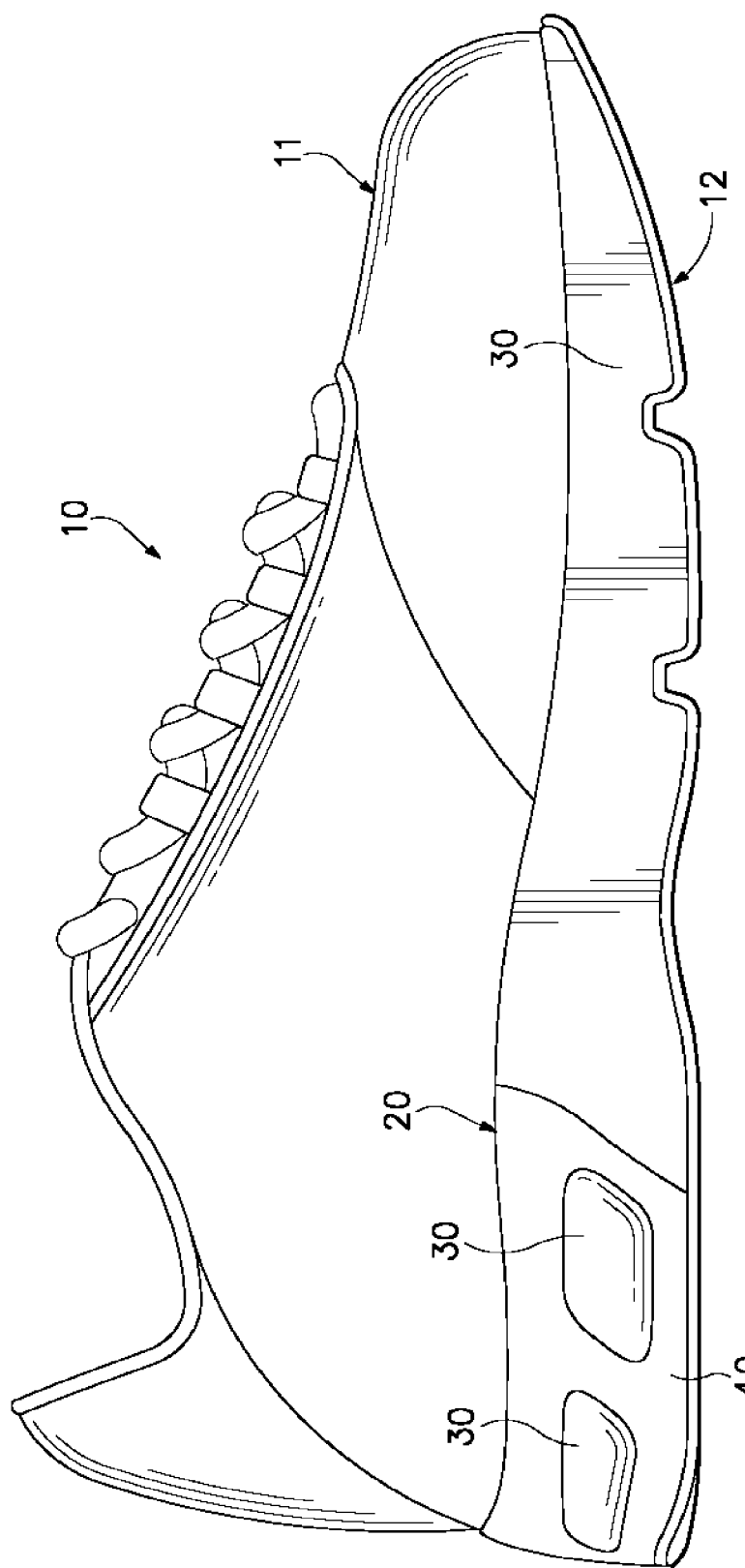
FIGS. 13A-13J are perspective views depicting additional configurations of the sole component.
Figure 13B:
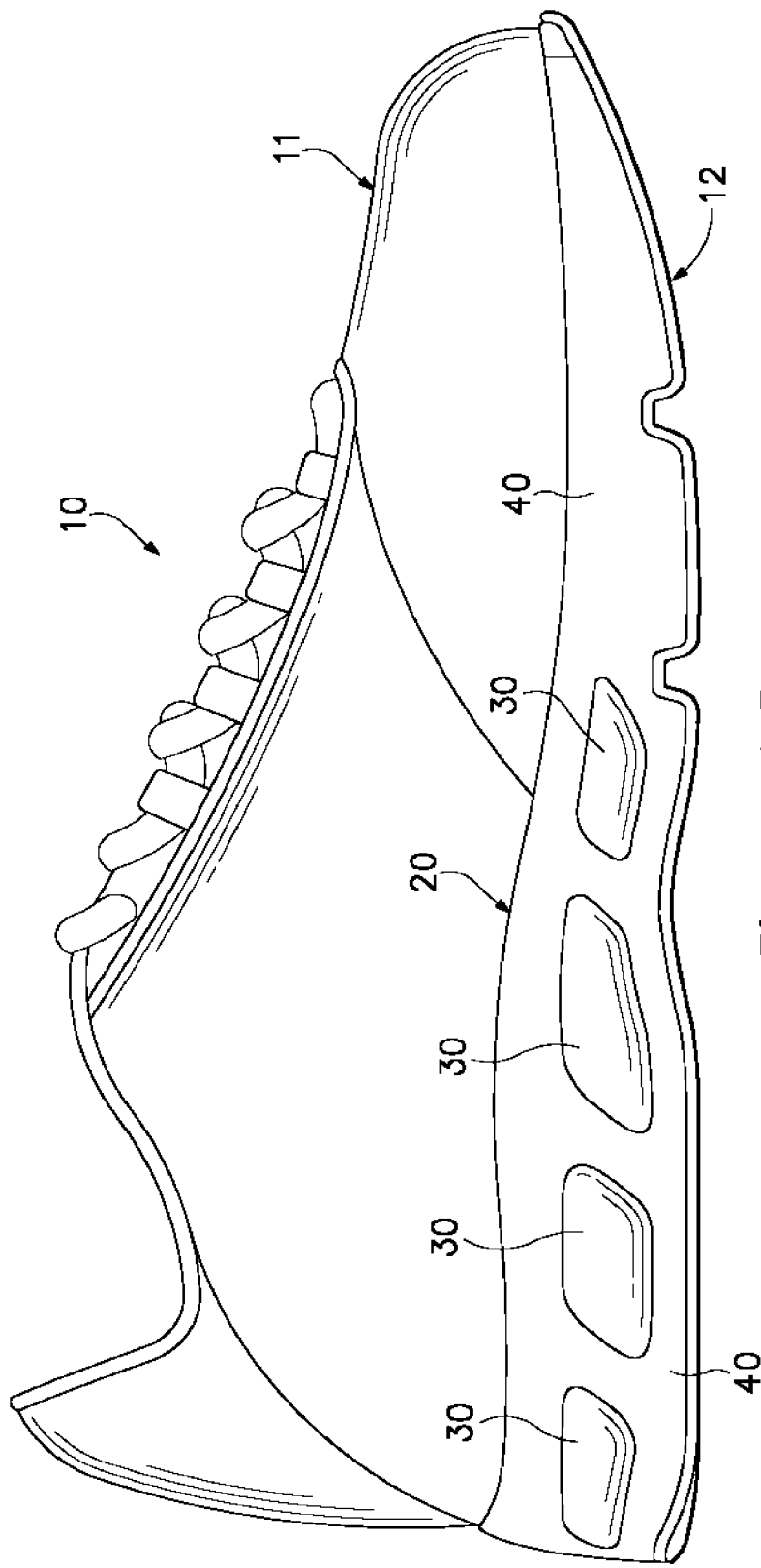
Figure 13C:
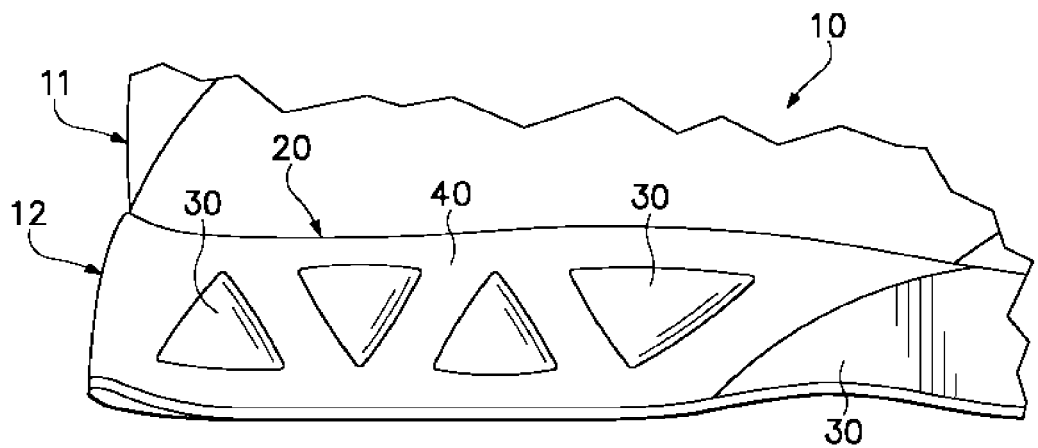
Figure 13D:
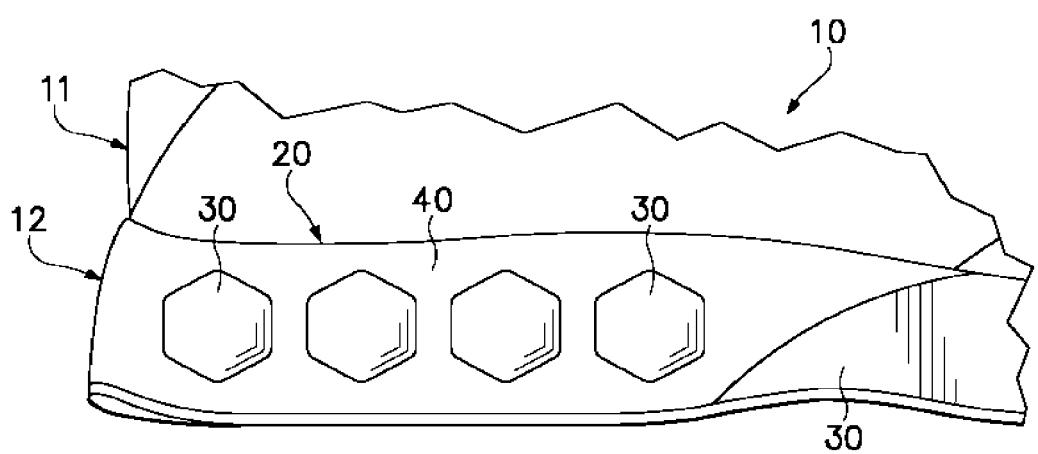
Figure 13E:
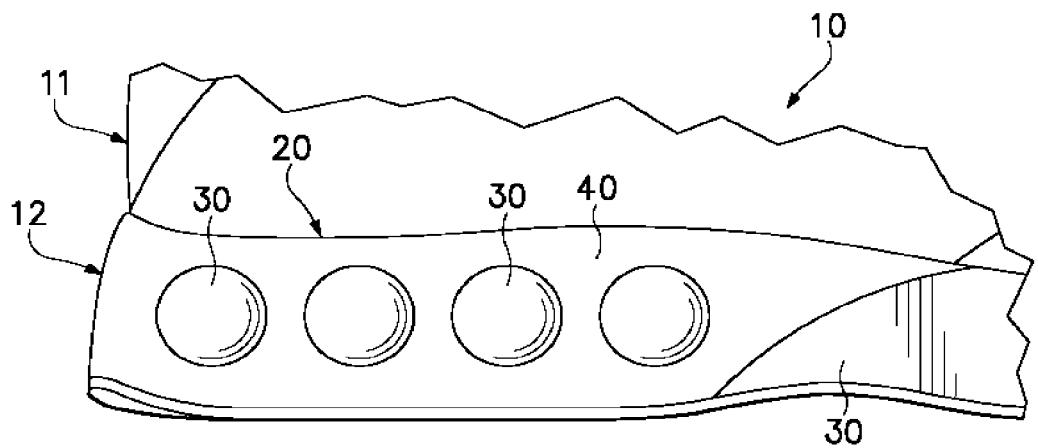
Figure 13F:
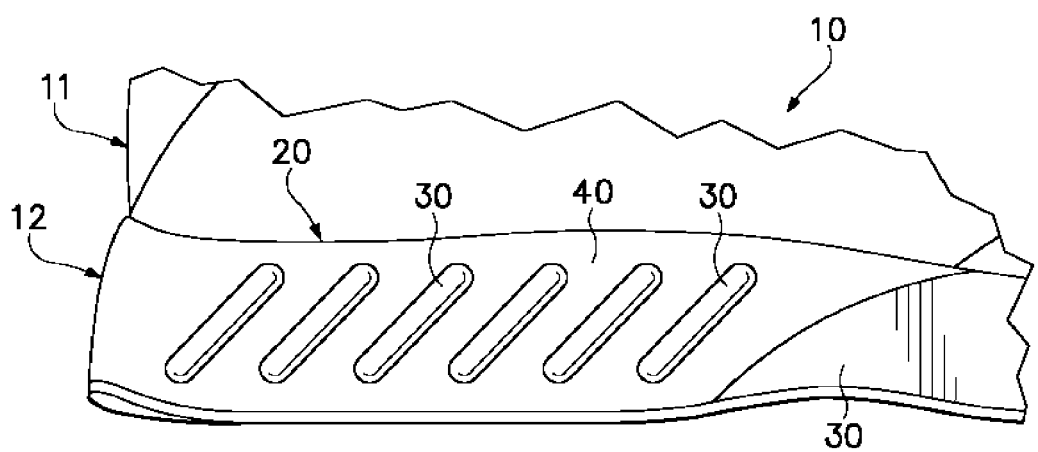
Figure 13G:
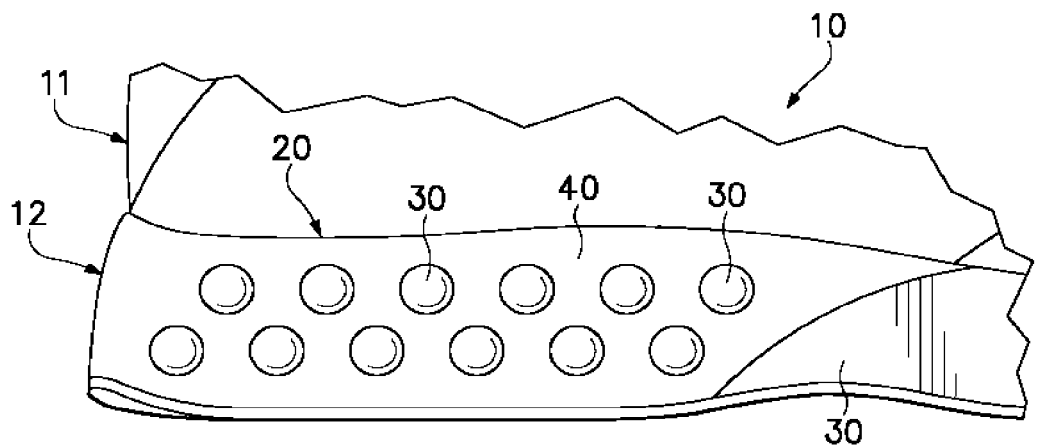

In the configuration discussed above, reinforcing element 40 extends from heel region 17 to approximately midfoot region 16 on both the lateral and medial sides of sole structure 20. However, reinforcing element 40 may extend through all of regions 15-17 or may be restricted to one or more of the regions 15-17. FIG. 13A depicts a configuration of reinforcing element 40 that is limited only to the heel region 17. Alternately, FIG. 13B depicts a configuration of reinforcing element 40 that extends through each of regions 15-17.

Figure 13H:
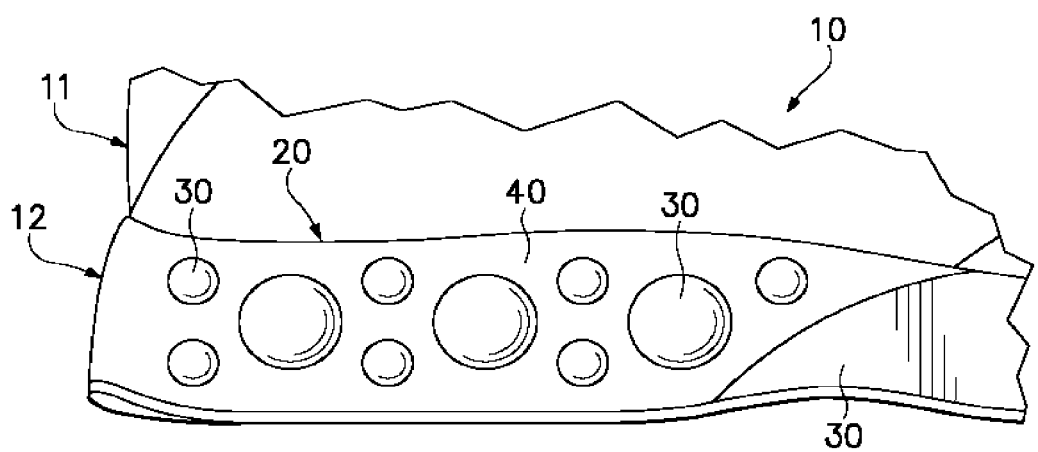
Figure 13I:
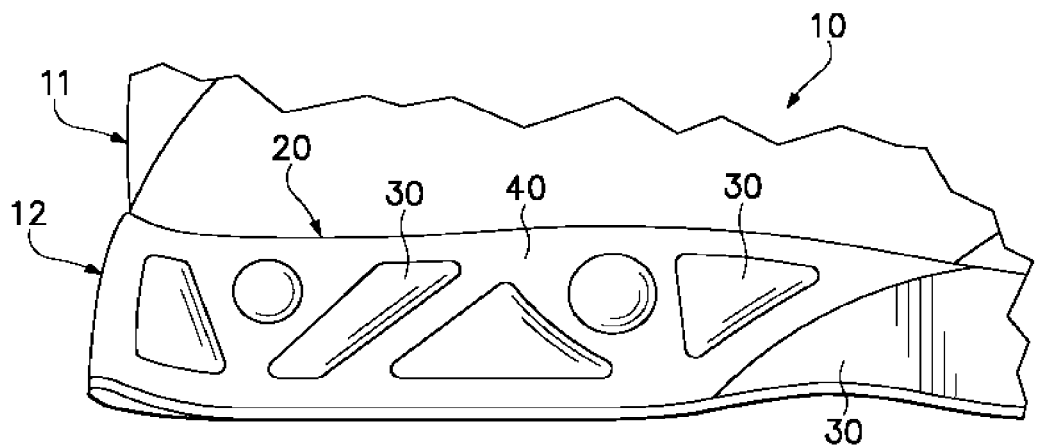
Figure 13J:
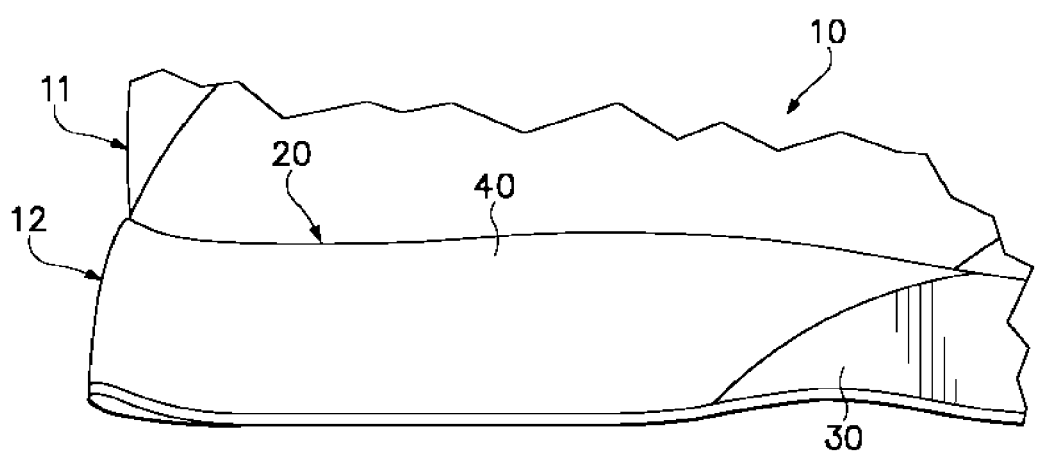

Reinforcing element 40 is depicted above as having relatively large apertures with an approximate parallelogram shape. However, the size and shape of the apertures is not limited to this configuration and may be round, oval or other geometric or non-geometric shapes. FIGS. 13C-13H depict several possible aperture shapes, including triangular as in FIG. 13C, hexagonal as in FIG. 13D, circular as in FIG. 13E, or slit-shaped as in FIG. 13F. However, possible shapes are not limited to these and may be other geometric or non-geometric shapes. Additionally, the apertures themselves may be of any size from relatively large, as depicted in FIGS. 1-6, to relatively small, as in FIG. 13G. Reinforcing element 40 may also have a mixture of aperture sizes, as shown in FIG. 13H. In other configurations, a mixture of aperture sizes and shapes may be used, as in FIG. 13I. In some configurations, apertures may be absent from reinforcing element 40, as depicted in FIG. 13J.

Figure 14:
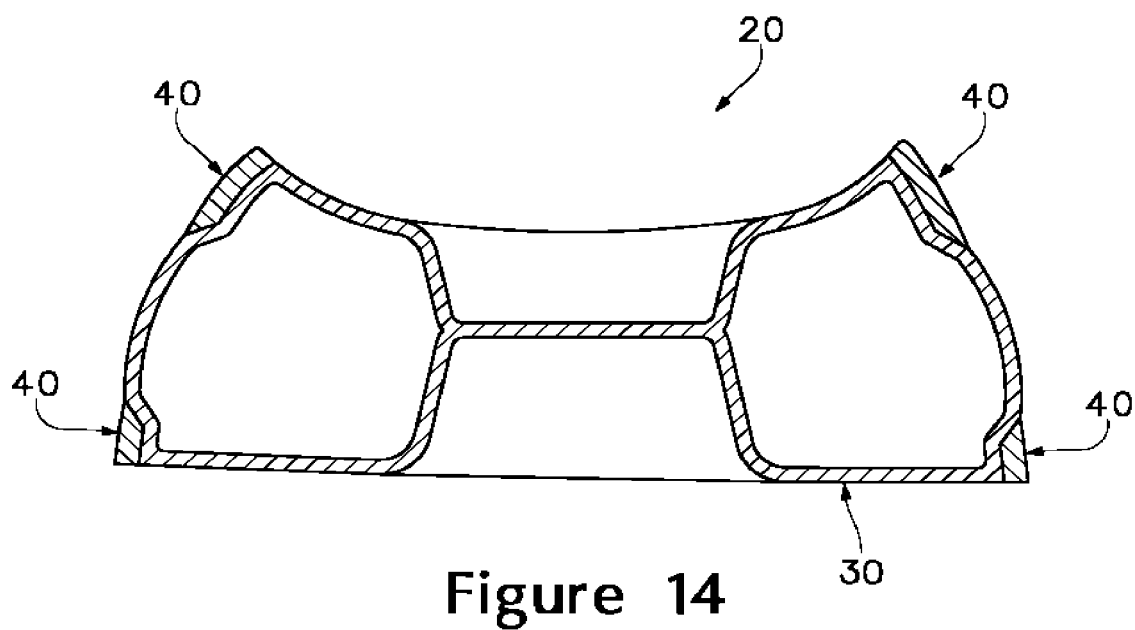
FIG. 14 is a cross-sectional view corresponding with FIG. 7A and depicting an additional configuration of the sole component.

The edges of reinforcing element 40, as depicted in FIGS. 7A and 7B, exhibit a squared cross section. In order to facilitate closer contact between reinforcing element 40 and bladder 30, some or all of the edges of reinforcing element 40 may be beveled, as depicted in FIG. 14. This may minimize stretch and potential thinning in areas where upper barrier layer 31 contacts reinforcing element 40 during the manufacturing process.

Conclusion

The preceding discussion disclosed various sole component configurations and a methods of manufacturing the sole components. In general, the sole components include a fluid-filled bladder and a reinforcing element extending around the bladder. The reinforcing element is bonded to the exterior of the bladder, and may be recessed into the bladder. In some configurations, the reinforcing element extends along the side surfaces of the bladder and between upper and lower surfaces of bladder. In manufacturing the sole component, the reinforcing element may be located within a mold, and the polymer material forming the bladder may be bonded to the reinforcing element during the molding process.

The present invention is disclosed above and in the accompanying drawings with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A sole structure for an article of footwear having an upper, the sole structure comprising:
 a chamber enclosing a fluid and including an upper surface opposing the upper, a side surface depending from the upper surface, at least one protrusion extending from the side surface and terminating at a distal end, and a recess defined by the at least one protrusion and the side surface and having a squared edge at a junction of the at least one protrusion and the side surface; and
 a reinforcing element (i) attached to the chamber at the side surface and received within the squared edge of the recess, (ii) extending continuously from a first end terminating at a medial side of sole structure, around a heel region of the sole structure, to a second end terminating at a lateral side of the sole structure, (iii) including at least one aperture formed through a thickness of the reinforcing element and receiving the at least one protrusion therein; and (iv) having an upper portion extending from a lower end disposed at the junction of the at least one protrusion and the side surface to an upper distal end aligned with the upper surface of the chamber, the upper portion having a constant thickness from the lower end to the upper distal end.

2. The sole structure of claim 1, wherein the at least one aperture is formed in a heel region of the reinforcing element.

3. The sole structure of claim 1, wherein the at least one aperture is formed on one of a medial side of the reinforcing element and a lateral side of the reinforcing element.

4. The sole structure of claim 1, wherein the at least one aperture is one of (i) a polygon, (ii) a circle, or (iii) elongate.

5. The sole structure of claim 1, wherein the reinforcing element is attached to the side surface of the chamber.

6. The sole structure of claim 1, wherein the distal end of the at least one protrusion extends from an outer peripheral surface of the reinforcing element.

7. The sole structure of claim 6, wherein the outer peripheral surface of the reinforcing element forms an outer surface of the sole structure.

8. The sole structure of claim 6, wherein the distal end of the at least one protrusion defines an arcuate outer surface.

9. The sole structure of claim 1, wherein the distal end of the at least one protrusion defines an arcuate outer surface.

10. An article of footwear incorporating the sole structure of claim 1.

11. A sole structure for an article of footwear having an upper, the sole structure comprising:
 a chamber enclosing a fluid and including an upper surface opposing the upper, a side surface depending from the upper surface, at least one protrusion extending from the side surface and terminating at a distal end, and a recess defined by the at least one protrusion and the side surface and having a squared edge at a junction of the at least one protrusion and the side surface; and
 a reinforcing element (i) attached to the chamber at the side surface and received within the squared edge of the recess, (ii) extending continuously from a first end terminating at a medial side of sole structure, around a heel region of the sole structure, to a second end terminating at a lateral side of the sole structure, (iii) including an outer peripheral surface forming an outer surface of the sole structure, the at least one protrusion extending past the outer surface of the sole structure; and (iv) having an upper portion extending from a lower end disposed at the junction of the at least one protrusion and the side surface to an upper distal end aligned with the upper surface of the chamber, the upper portion having a constant thickness from the lower end to the upper distal end.

12. The sole structure of claim 11, further comprising at least one aperture formed through a thickness of the reinforcing element.

13. The sole structure of claim 12, wherein the at least one aperture is formed on one of a medial side of the reinforcing element and a lateral side of the reinforcing element.

14. The sole structure of claim 12, wherein the at least one aperture is one of (i) a polygon, (ii) a circle, or (iii) elongate.

15. The sole structure of claim 12, wherein the at least one protrusion extends through the at least one aperture.

16. The sole structure of claim 15, wherein the distal end of the at least one protrusion defines an arcuate outer surface.

17. The sole structure of claim 16, wherein the distal end of the at least one protrusion terminates at the outer peripheral surface.

18. The sole structure of claim 11, wherein the distal end of the at least one protrusion defines an arcuate outer surface.

19. The sole structure of claim 11, wherein the reinforcing element is attached to the side surface of the chamber.

20. An article of footwear incorporating the sole structure of claim 11.

* * * * *